(12) United States Patent
Kim et al.

(10) Patent No.: US 11,251,540 B2
(45) Date of Patent: Feb. 15, 2022

(54) METHOD FOR CONTROLLING ANTENNA AND ELECTRONIC DEVICE THEREOF

(71) Applicant: Samsung Electronics Co., Ltd., Gyeonggi-do (KR)

(72) Inventors: Sung-Soo Kim, Gyeonggi-do (KR); Min-Chull Paik, Gyeonggi-do (KR); Yongjun An, Gyeonggi-do (KR); Sang Youn Lee, Gyeonggi-do (KR); Hyoungjoo Lee, Gyeonggi-do (KR); Dong-Hoon Han, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 680 days.

(21) Appl. No.: 16/092,329

(22) PCT Filed: Feb. 9, 2017

(86) PCT No.: PCT/KR2017/001422
§ 371 (c)(1),
(2) Date: Oct. 9, 2018

(87) PCT Pub. No.: WO2017/175964
PCT Pub. Date: Oct. 12, 2017

(65) Prior Publication Data
US 2021/0218158 A1    Jul. 15, 2021

(30) Foreign Application Priority Data
Apr. 8, 2016 (KR) .................. 10-2016-0043632

(51) Int. Cl.
*H04B 7/04* (2017.01)
*H01Q 21/28* (2006.01)
(Continued)

(52) U.S. Cl.
CPC ............. *H01Q 21/28* (2013.01); *H01P 1/213* (2013.01); *H01Q 1/242* (2013.01); *H01Q 5/307* (2015.01);
(Continued)

(58) Field of Classification Search
CPC ........ H04B 1/005; H04B 1/0064; H04B 7/02; H04B 7/04; H01Q 1/242; H01Q 5/307; H01Q 21/28; H01Q 9/0414
See application file for complete search history.

(56) References Cited

U.S. PATENT DOCUMENTS

| 8,159,399 B2 | 4/2012 | Dorsey et al. |
| 2009/0011787 A1 | 1/2009 | Kikuma |

(Continued)

FOREIGN PATENT DOCUMENTS

| EP | 2 161 851 | 3/2010 |
| EP | 3 035 542 | 6/2016 |

(Continued)

OTHER PUBLICATIONS

Indian Examination Report dated Feb. 24, 2021 issued in counterpart application No. 201837038281, 7 pages.

(Continued)

*Primary Examiner* — Blane J Jackson
(74) *Attorney, Agent, or Firm* — The Farrell Law Firm, P.C.

(57) ABSTRACT

Various examples of the present invention relate to an apparatus and a method for controlling a connection and an operation of an antenna in an electronic device. Here, the electronic device comprises: a plurality of antenna units arranged in a first region thereof; at least one antenna unit arranged in a second region thereof; a communication circuit, which is connected to the plurality of antenna units arranged in the first region and to at least one antenna unit (Continued)

arranged in the second region; a first switch arranged in an electric path, which connects the plurality of antenna units with the communication circuit; and a second switch arranged in an electric path, which connects the at least one antenna unit with the communication circuit, wherein the first switch and the second switch can be configured to connect the plurality of antenna units with the communication circuit and the at least one antenna unit with the communication circuit, by using a first electric path and a second electric path for connecting the first switch and the second switch. Other examples are possible.

14 Claims, 29 Drawing Sheets

(51) Int. Cl.
*H01Q 5/307* (2015.01)
*H01P 1/213* (2006.01)
*H01Q 1/24* (2006.01)
*H01Q 9/04* (2006.01)
*H04B 1/401* (2015.01)
*H04B 7/06* (2006.01)
*H04B 1/3827* (2015.01)

(52) U.S. Cl.
CPC ............ *H01Q 9/0414* (2013.01); *H04B 1/401* (2013.01); *H04B 7/0602* (2013.01); *H04B 1/3833* (2013.01)

(56) References Cited

U.S. PATENT DOCUMENTS

| | | |
|---|---|---|
| 2010/0120466 A1 | 5/2010 | Li |
| 2011/0117863 A1 | 5/2011 | Camp et al. |
| 2014/0024321 A1 | 1/2014 | Zhu et al. |
| 2014/0148215 A1 | 5/2014 | Liu et al. |
| 2014/0169243 A1 | 6/2014 | Khlat et al. |
| 2015/0003380 A1 | 1/2015 | Ling et al. |
| 2015/0017929 A1 | 1/2015 | Ljung et al. |
| 2015/0340769 A1 | 11/2015 | Desclos et al. |
| 2015/0365054 A1 | 12/2015 | Jeong |
| 2016/0119016 A1* | 4/2016 | Khlat ................ H04B 1/44 370/278 |
| 2016/0173172 A1* | 6/2016 | Greene ............ H04B 7/0802 455/562.1 |
| 2016/0365909 A1 | 12/2016 | Kim et al. |
| 2017/0353955 A1* | 12/2017 | Hsu ................ H04W 72/0453 |

FOREIGN PATENT DOCUMENTS

| | | | |
|---|---|---|---|
| EP | 3035542 A1 * | 6/2016 | ......... H04B 7/0802 |
| KR | 1020100083074 | 7/2010 | |
| KR | 1020100108062 | 10/2010 | |
| KR | 101281950 | 7/2013 | |
| KR | 1020150142391 | 12/2015 | |
| KR | 1020160145449 | 12/2016 | |
| WO | WO 2014/210348 | 12/2014 | |

OTHER PUBLICATIONS

PCT/ISA/210 Search Report issued on PCT/KR2017/001422 (pp. 5).
PCT/ISA/237 Written Opinion issued on PCT/KR2017/001422 (pp. 4).
European Search Report dated Dec. 9, 2019 issued in counterpart application No. 17779265.2-1220, 15 pages.
European Search Report dated Mar. 13, 2019 issued in counterpart application No. 17779265.2-1220, 14 pages.
European Search Report dated Dec. 1, 2021 issued in counterpart application No. 17779265.2-1216, 5 pages.

* cited by examiner

METHOD FOR CONTROLLING ANTENNA AND ELECTRONIC DEVICE THEREOF

PRIORITY

This application is a National Phase Entry of PCT International Application No. PCT/KR2017/001422, which was filed on Feb. 9, 2017, and claims priority to Korean Patent Application No. 10-2016-0043632, which was filed on Apr. 8, 2016, the contents of each of which are incorporated herein by reference.

TECHNICAL FIELD

Various embodiments of the present invention relate to an apparatus and method for controlling a plurality of antennas in an electronic device.

BACKGROUND ART

Use of electronic devices increases with developments of communication technology and semiconductor technology, and a traffic amount used by the electronic device increases due to high utilization of wireless communication technology.

The electronic device may apply various techniques to increase a wireless communication rate due to the increase of the traffic. For example, the electronic device may use a multi-antenna transmission scheme (e.g., multiple-input multiple-output (MIMO)) which may increase a data rate and data transmission reliability using a plurality of antennas.

DISCLOSURE OF INVENTION

Technical Problem

An electronic device including a plurality of antennas may set one antenna as a main antenna for transmission and reception operations of the electronic device, and set another antenna as a sub antenna for the reception operation of the electronic device. Accordingly, the electronic device may connect the main antenna to a transceiving unit of the electronic device, and connect the sub antenna to a receiving unit of the electronic device.

The electronic device may change operations of the main antenna and the sub antenna based on performance of the main antenna. For example, if the performance of the main antenna does not satisfy reference performance, the electronic device may change the operations of the antennas so that the sub antenna performs the transmission and reception operations of the electronic device and the main antenna performs the receiving operation of the electronic device. Accordingly, the electronic device may connect the sub antenna to the transceiving unit of the electronic device and connect the main antenna to the receiving unit of the electronic device.

However, if changing the connections between the antennas and the transceiving unit and the receiving unit, the electronic device may be subject to a problem which increases signal loss in a wireless frequency band used by the electronic device.

Various embodiments of the present invention may provide an apparatus and method for switching the antennas to optimize impedance in the electronic device.

Solution to Problem

According to various embodiments of the present invention, an electronic device may include a plurality of antenna units disposed in a first region of the electronic device, at least one antenna unit disposed in a second region of the electronic device, a communication circuit connected with the plurality of the antenna units disposed in the first region and the at least one antenna unit disposed in the second region, a first switch disposed in an electrical path which connects the at least one antenna unit with the communication circuit, and a second switch disposed in an electrical path which connects the at least one antenna unit with the communication circuit, wherein the first switch and the second switch may be configured to connect the plurality of the antenna units with the communication circuit and the at least one antenna unit with the communication circuit using a first electrical path and a second electrical path which connect the first switch and the second switch.

According to various embodiments of the present invention, an operating method of an electronic device may include, if a first antenna unit disposed in a first region of the electronic device operates as a main antenna and a second antenna unit disposed in a second region operates as a sub antenna, tuning antenna impedance in a closed loop scheme, identifying performance of the first antenna unit and the second antenna unit, determining operations of the first antenna unit and the second antenna unit based on a performance comparison result of the first antenna unit and the second antenna unit, and, if determining to operate the first antenna unit as the sub antenna and to operate the second antenna unit as the main antenna, tuning the antenna impedance in an open loop scheme.

According to various embodiments of the present invention, an electronic device includes an external housing which includes a first portion, a second portion adjacent to the first portion, a third portion further apart from the first portion than the second portion, and a fourth portion adjacent to the third portion, a first antenna radiator which forms at least part of the first portion and/or is formed in the housing in proximity to the first portion, a second antenna radiator which forms at least part of the second portion and/or is formed in the housing in proximity to the second portion, a third antenna radiator which forms at least part of the third portion and/or is formed in the housing in proximity to the third portion, a fourth antenna radiator which forms at least part of the fourth portion and/or is formed in the housing in proximity to the fourth portion, at least one communication circuit for supporting a frequency of a first frequency band and a frequency of a second frequency band which is lower than the first frequency band, a first electrical path configured to electrically connect the at least one communication circuit with the first antenna radiator, to transmit a signal of the frequency of the first frequency band, a second electrical path configured to electrically connect the at least one communication circuit with the second antenna radiator, to transmit a signal of the frequency of the first frequency band or the second frequency band at the same time or selectively, a third electrical path configured to electrically connect the at least one communication circuit with the third antenna radiator, to transmit a signal of the frequency of the first frequency band or the second frequency band at the same time or selectively, a fourth electrical path configured to electrically connect the at least one communication circuit with the fourth antenna radiator, to transmit a signal of the frequency of the first frequency band, a first switch for selectively connecting the first antenna, the second antenna, and the fifth electrical path with the first electrical path, the second electrical path, and the sixth electrical path respectively, and a second switch for selectively connecting the third antenna, the fourth antenna, and the sixth electrical path with the third electrical path, the fourth electrical path, and the fifth, electrical path respectively, wherein the fifth electrical path may transmit a signal of the first electrical path in a first state of the first switch and transmit a signal of the second electrical path in a second state of the first switch, and the sixth electrical path may transmit a signal of the third electrical path in a first state of the second switch and transmit a signal of the fourth electrical path in a second state of the second switch.

Advantageous Effects of Invention

An electronic device and an operating method according to various embodiments may reduce a cost and complexity required for configuring a switching circuit, by switching a plurality of antennas of the electronic device by use of two switches for antenna switching and two paths which connect the two switches.

An electronic device and an operating method according to various embodiments may provide an optimal communication quality to a user of the electronic device, by selectively using up and down/left and right antenna switching and multi-receive antenna mode switching.

BEST MODE FOR CARRYING OUT THE INVENTION

Figure 1A:
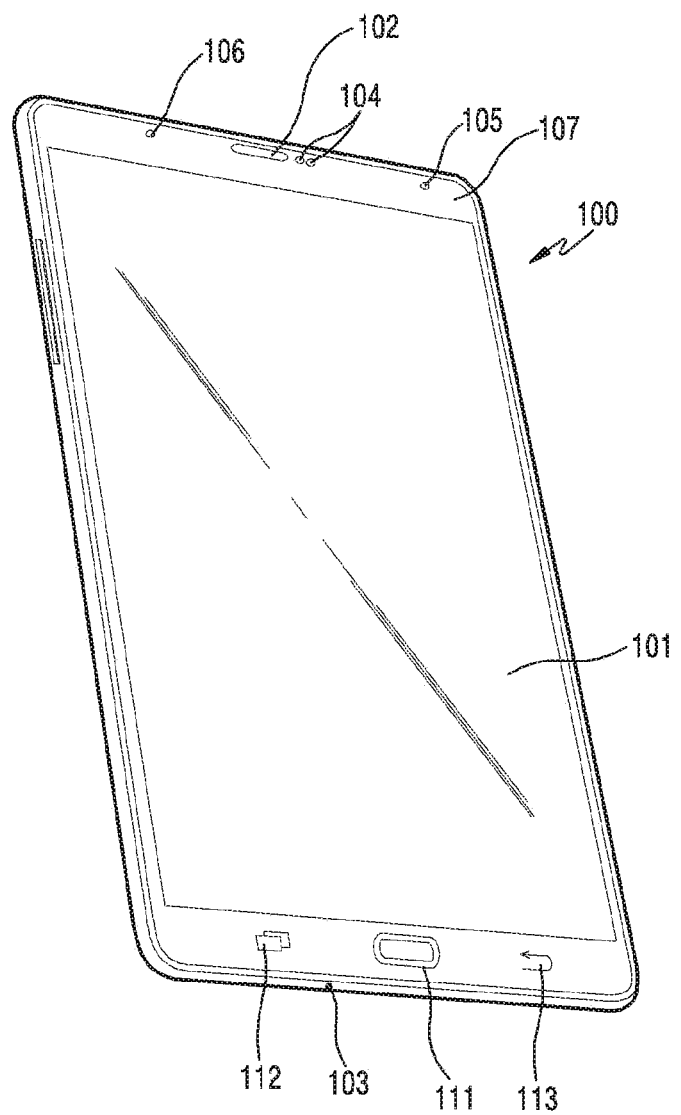
FIG. 1A illustrates a perspective view of an electronic device according to various embodiments of the present invention.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure. The terms used herein are defined in consideration of functions of the present disclosure and may vary depending on a user's or an operator's intension and usage. Therefore, the terms used herein should be understood based on the descriptions made herein. It is to be understood that the singular forms "a," "an," and "the" include plural referents unless the context clearly dictates otherwise.

In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be a generic-purpose processor (such as a Central Processing Unit (CPU) or an application processor) that can perform a corresponding operation by executing at least one software program stored at an exclusive processor (such as an embedded processor) for performing a corresponding operation or at a memory device.

An electronic device according to embodiments of the present disclosure, may be embodied as, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a medical equipment, a camera, and a wearable device. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit.

The electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MM) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler).

According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to an embodiment, can be a flexible electronic device or a combination of two or more of the foregoing various devices. An electronic device, according to an embodiment of the present disclosure, is not limited to the foregoing devices may be embodied as a newly developed electronic device. The term "user", as used herein, can refer to a person using an electronic device or a device using an electronic device (e.g., an artificial intelligence electronic device).

In the following descriptions, up/down antenna switching may indicate an antenna switching scheme for switching an operation scheme (e.g., a main antenna, a sub antenna) of antennas disposed in different regions (e.g., a top and a bottom of an electronic device) in an electronic device. For example, the main antenna may indicate an antenna for transceiving signals in a corresponding frequency band, and the sub antenna may indicate an antenna for receiving a signal in a corresponding frequency band.

In the following descriptions, left/right antenna switching may indicate an antenna switching scheme for switching an operating frequency band of antennas disposed in the same region (e.g., the top or the bottom of the electronic device) in the electronic device.

FIG. 1A illustrates a perspective view of an electronic device according to various embodiments of the present invention.

Referring to FIG. 1A, a front side 107 of an electronic device 100 may include a display 101. A speaker device 102 for receiving voice of other party may be disposed above the display 101. A microphone device 103 for transmitting electronic device user's voice to the other party may be disposed below the display 101.

According to an embodiment, the vicinity of the speaker device 102 may include at least one sensor 104. For example, the sensor 104 may include at least one of an illuminance sensor (e.g., an optical sensor), a proximity sensor, an infrared sensor, or an ultrasonic sensor.

According to an embodiment, the vicinity of the speaker device 102 may include a camera device 105. In addition, the vicinity of the speaker device 102 may include an indicator 106 for notifying status information of the electronic device 100 to the user.

According to an embodiment, buttons 111, 112, and 113 for detecting a user input may be included below the display 101. For example, the first button 111 may be configured with a hardware button, and the second button 112 and third button 113 may be configured with a touch pad. For example, the buttons 111, 112, and 113 for detecting the user input may be configured as part of a touch pad or a touch screen.

Figure 1B:
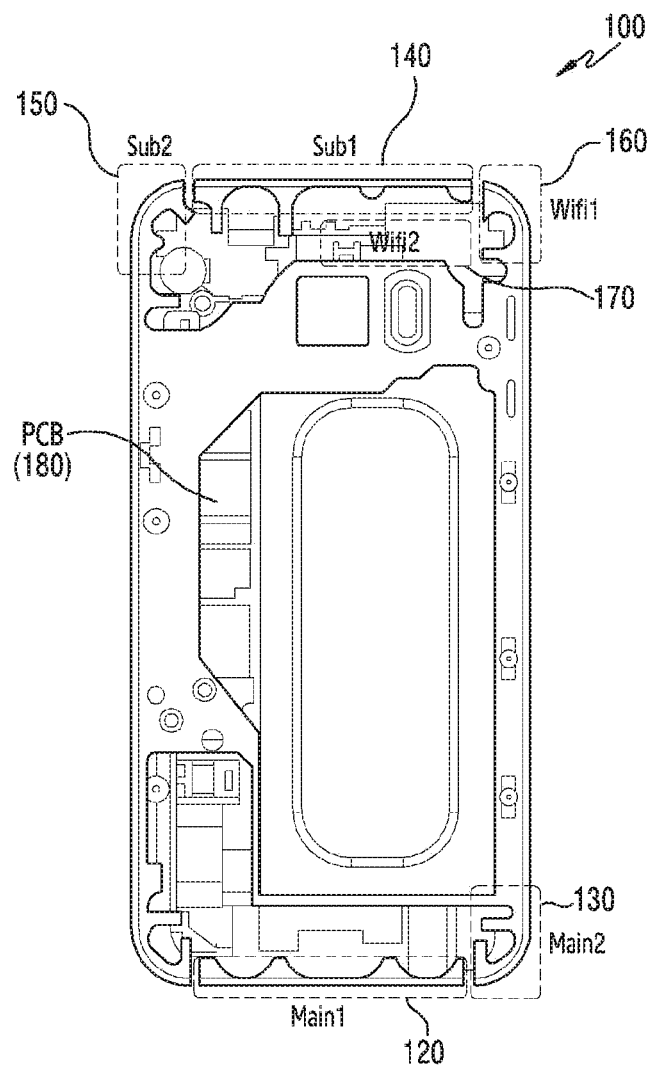
FIG. 1B illustrates an antenna arrangement of an electronic device according to various embodiments of the present invention.

FIG. 1B illustrates an antenna arrangement of an electronic device according to various embodiments of the present invention.

Referring to FIG. 1B, the electronic device 100 may include at least one of a plurality of antenna units 120 through 170. For example, the plurality of the antenna units 120 through 170 may be disposed at a top or a bottom of a printed circuit board (PCB) 180 of the electronic device 100.

According to an embodiment, the first antenna unit 120 and the second antenna unit 130 may include a main antenna for transceiving signals for a voice service or a data service. For example, the first antenna unit 120 and the second antenna unit 130 may be disposed in a first region (e.g., a bottom region of the electronic device) of the electronic device 100. For example, the first antenna unit 120 may transceive signals of a middle frequency band (e.g., 1700 MHz~2100 MHz) or a low frequency band (e.g., 700 MHz~900 MHz). The second antenna unit 130 may transceive signals of a high frequency band (e.g., 2300 MHz~2700 MHz) or the middle frequency band. For example, the first antenna unit 120 and the second antenna unit 130 may be separated physically or logically.

According to an embodiment, the third antenna unit 140 through the sixth antenna unit 170 may include a sub antenna for receiving a signal for a voice service or a data service. For example, the third antenna unit 140 through the sixth antenna unit 170 may be disposed in a second region (e.g., a top region of the electronic device) of the electronic device 100. For example, the third antenna unit 140 may receive a signal of the middle frequency band or the low frequency band. The fourth antenna unit 150 may receive a signal of the high frequency band or the middle frequency band. Additionally, the fourth antenna unit 150 may receive a satellite signal. The fifth antenna unit 160 and the sixth antenna unit 170 may transceive a signal for wireless local area network (LAN) (e.g., wireless fidelity (WiFi)). For example, the third antenna unit 140 and the fourth antenna unit 150 may be separated physically or logically.

As described above, the electronic device 100 may dispose the first antenna unit 120 and the second antenna 130 in the first region, and dispose the third antenna unit 140 and the fourth antenna unit 150 in the second region for the sake of multi-antenna diversity or carrier aggregation. For example, the first region and the second region of the electronic device 100 may be physically separated, like the top and the bottom or left and right sides of the electronic device 100.

According to various embodiments of the present invention, the electronic device 100 may dispose the third antenna unit 140 and the fourth antenna unit 150 in the first region, and dispose the first antenna unit 120 and the second antenna unit 130 in the second region.

FIG. 2A to FIG. 2J illustrate an example of antenna connections in an electronic device according to various embodiments of the present invention. In the following, a first antenna 201 and a second antenna 203 may include the first antenna unit 120 and the second antenna unit 130 of FIG. 1B. A third antenna 211 and a fourth antenna 213 may include the third antenna unit 140 and the fourth antenna unit 150 of FIG. 1B.

Referring to FIG. 2A through FIG. 2J, an electronic device 200 may include a plurality of antennas 201, 203, 211, and 213, a plurality of diplexers 207 and 217, a plurality of radio frequency front end (RFFE) modules 209 and 219, and an RF integrated circuit (RFIC) module 221.

According to an embodiment, the plurality of the antennas 201, 203, 211, and 213 may include the first antenna 201 and the second antenna 203 disposed in a first region (e.g., a bottom region of the electronic device 200) of the electronic device 200, and the third antenna 211 and the fourth antenna 213 disposed in a second region (e.g., a top region of the electronic device 200). For example, the first antenna 201 and the second antenna 203 disposed in the first region may include an antenna impedance tuner for impedance tuning. Additionally or alternatively, the third antenna 211 and the fourth antenna 213 in the second region may include an antenna impedance tuner for the impedance tuning.

According to an embodiment, the switches 205 and 215 may switch connections of the antennas 201, 203, 211, and 213 and communications circuitry (e.g., the diplexers 207 and 217, the RFFE modules 209 and 219, the RFIC module 221) of the electronic device 200, using a first path 231 (a first electrical path) and a second path 233 (a second electrical pathway) which connect the first switch 205 and the second switch 215. For example, the switch 205 or 215 is an x pole y throw (xPyT) switch and may include input poles and output throws which are one more than the number of the antennas disposed in a corresponding region (e.g., the first region or the second region) for the connection with the other switch 215 or 205. For example, the first switch 205 may be configured in a 3P3T switch type, if the two antennas 201 and 203 are disposed in the first region. For example, the second switch 215 may be configured in a 3P3T switch type, if the two antennas 211 and 213 are disposed in the second region. For example, the first switch 205 may be configured in a 4P4T switch type, if three antennas are disposed in the first region. For example, the second switch 215 may be configured in a 2P2T switch type if one antenna is disposed in the second region. For example, the first path 231 and the second path 233 may be configured with a coaxial cable, a flexible PCB (FPCB) type, or a PCB internal path.

According to an embodiment, the switches 205 and 215 may switch the connections of the plurality of the antennas 201, 203, 211, and 213 and the internal elements of the electronic device 200 based on control of the RFIC module 221 or a processor (e.g., an application processor (AP) or a communication processor (CP)) of the electronic device 200.

According to an embodiment, the first diplexer 209 is used to transceive signals of the low frequency band and the middle frequency band via one of the antennas 201, 203, 211, and 213. The second diplexer 219 may be used to receive signals of the low frequency band and the middle frequency band via one of the antennas 201, 203, 211, and 213.

According to an embodiment, the main RFFE module 209 may process the signals transceived via one of the antennas 201, 203, 211, and 213, per frequency band of a corresponding signal. For example, the main RFFE module 209 may include a power amplifier module (PAM) switch or duplexers. For example, the power amplifier module may amplify power of a corresponding signal so that a signal to transmit via the antenna is delivered to other electronic device over a wireless environment. The switch may connect the duplexer for the frequency band of the signals transceived via the antenna with the power amplifier module.

According to an embodiment, the sub RFFE module 219 may process the signals received through one of the antennas 201, 203, 211, and 213, per frequency band of a corresponding signal. For example, the sub RFFE module 219 may include a low noise amplifier (LNA), and a band pass filter or switch. For example, the low noise amplifier may amplify the signal received through the antenna and thus compensate for loss of signal strength, which is caused until the received signal reaches the RFIC module 221. The switch may connect the band pass filter and the low noise amplifier for the frequency band of the signal received through the antenna.

According to an embodiment, the RFIC module 221 may process the signals transceived via the antennas 201, 203, 211, and 213. For example, the RFIC module 221 may convert RF signals received through the antennas 201, 203, 211, and 213 to baseband signals. The RFIC module 221 may convert baseband signals transmitted via the antennas 201, 203, 211, and 213 to RF signals.

Figure 2A:
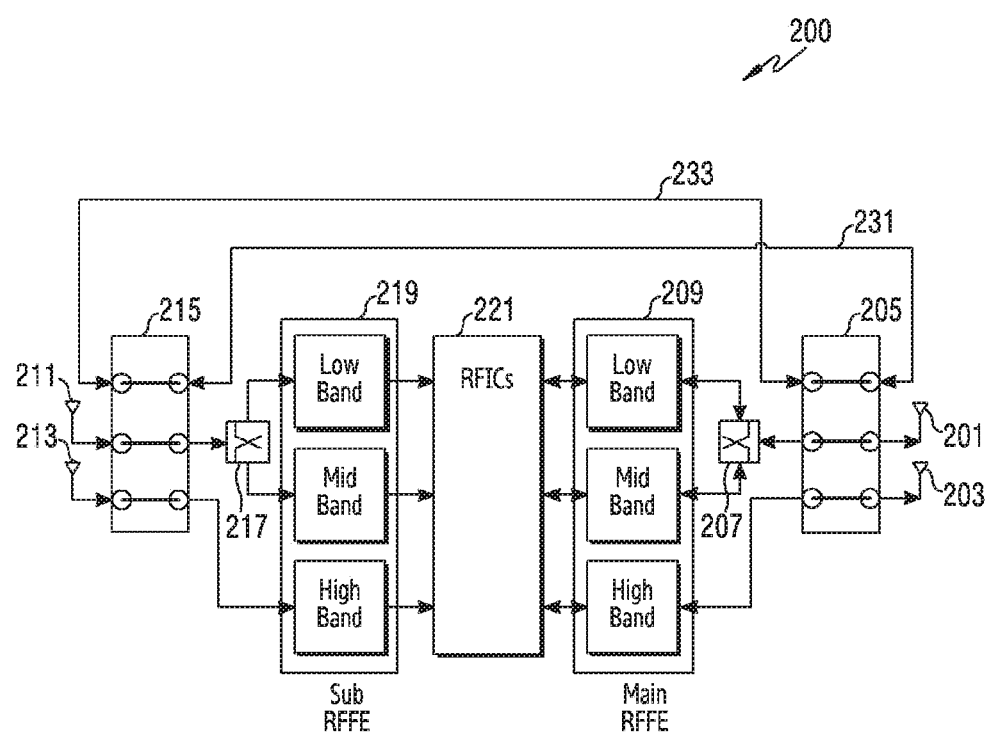
FIG. 2A to FIG. 2J illustrate an example of antenna connections in an electronic device according to various embodiments of the present invention.

FIG. 2A may present an antenna connection state if the first antenna 201 and the second antenna 203 operate as a main antenna for a corresponding frequency band and the third antenna 211 and the fourth antenna 213 operate as a sub antenna of a corresponding frequency band.

According to an embodiment, if the first antenna 201 and the second antenna 203 operate as the main antenna for transceiving signals in the electronic device 200, the first switch 205 may connect the first antenna 201 and the second antenna 203 with the main RFFE module 209. For example, if the first antenna 201 operates as the main antenna of a first frequency band (e.g., the low frequency band and the middle frequency band), it may be connected with the first diplexer 207 through the first switch 205. For example, if the second antenna 203 operates as the main antenna of a second frequency band (e.g., the high frequency band), it may be connected with the main RFFE module 209 through the first switch 205.

According to an embodiment, if the third antenna 211 and the fourth antenna 213 operate as the sub antenna for receiving signals in the electronic device 200, the second switch 215 may connect the third antenna 211 and the fourth antenna 213 with the sub RFFE module 219. For example, if the third antenna 211 operates as the sub antenna of the first frequency band, it may be connected with the second diplexer 217 through the second switch 215. For example, if the fourth antenna 213 operates as the sub antenna of the second frequency band, it may be connected with the sub RFFE module 219 through the second switch 215. Hence, signals received through the third antenna 211 and the fourth antenna 213 may be compensated for signal strength loss which is caused until they reach the RFIC module 221 through the low noise amplifier of the sub RFFE module 219.

Figure 2B:
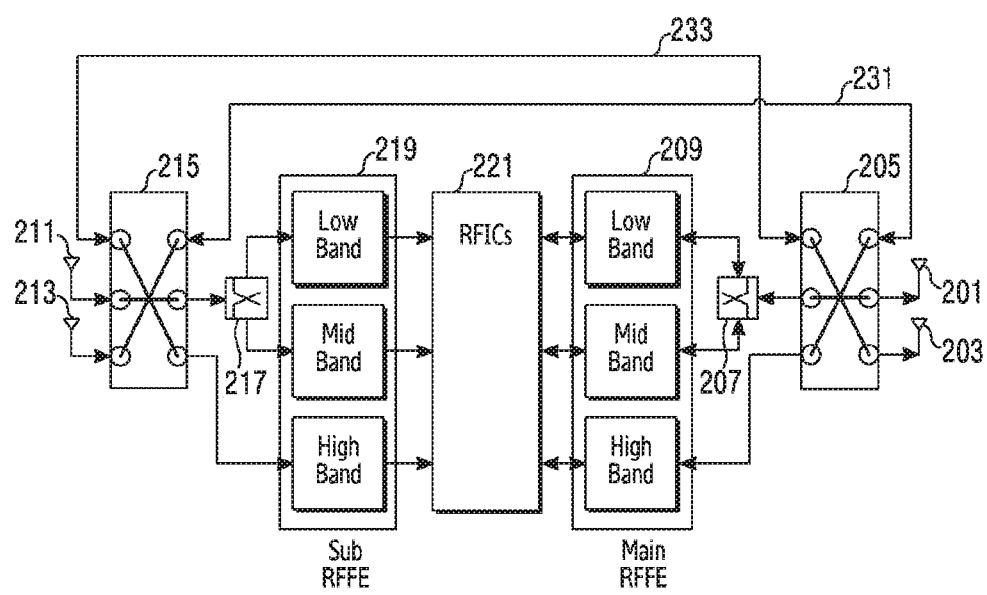

FIG. 2B may present an antenna connection state if the second antenna 203 operates as the sub antenna of the second frequency band and the fourth antenna 213 operates as the main antenna of the second frequency band. For example, FIG. 2B may present the antenna connection state for switching (up/down antenna switching) the antenna operations of the second antenna 203 disposed in a first area of the electronic device 200 and the fourth antenna 213 disposed in a second region. Hereafter, since the first antenna 201 and the second antenna 211 of FIG. 2B operate the same as in FIG. 2A, descriptions on the antenna connection state of the first antenna 201 and the second antenna 211 are omitted.

According to an embodiment, if the second antenna 203 operates as the sub antenna for receiving signals in the second frequency band according to the up/down antenna switching, it may be connected to the sub RFFE module 219 through the second path 233 which connects the first switch 205 and the second switch 215. Hence, the signal received via the second antenna 203 may be compensated for the signal strength loss through the low noise amplifier of the sub RFFE module 219.

According to an embodiment, if the fourth antenna 213 operates as the main antenna for transceiving signals in the second frequency band according to the up/down antenna switching, it may be connected to the main RFFE module 209 through the first path 231 which connects the first switch 205 and the second switch 215. Thus, the fourth antenna 213 may transmit a signal provided from the main RFFE module 209 to other electronic device. In addition, a signal received through the fourth antenna 213 may be sent to the main RFFE module 209.

Figure 2C:
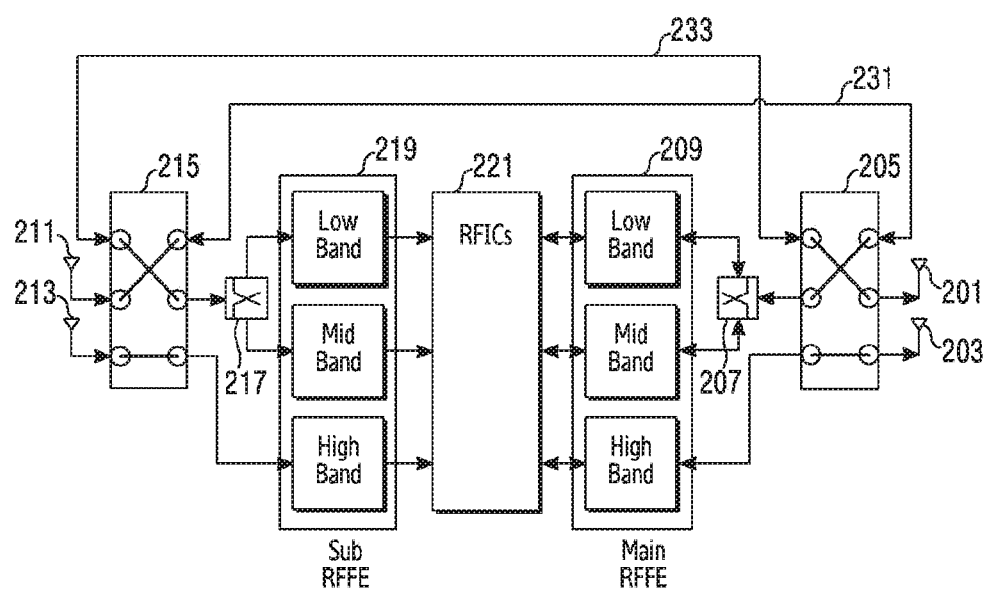

FIG. 2C may represent an antenna connection state if the first antenna 201 operates as the sub antenna of the first frequency band and the third antenna 211 operates as the main antenna of the first frequency band. For example, FIG. 2C may present the antenna connection state for switching (up/down antenna switching) the operations of the first antenna 201 disposed in the first region of the electronic device 200 and the third antenna 211 disposed in the second region. Since the second antenna 203 and the fourth antenna 213 of FIG. 2C operate the same as in FIG. 2A, descriptions on the antenna connection state of the second antenna 203 and the fourth antenna 213 are omitted in the following.

According to an embodiment, if the first antenna 201 operates as the sub antenna for receiving signals in the first frequency band according to the up/down the antenna switching, it may be connected to the sub RFFE module 219 through the second path 233 which connects the first switch 205 and the second switch 215. Hence, a signal received through the first antenna 201 may be sent to the sub RFFE module 219 via the second diplexer 217.

According to an embodiment, if the third antenna 211 operates as the main antenna for transceiving signals in the first frequency band according to the up/down the antenna switching, it may be connected to the main RFFE module 209 through the first path 231 which connects the first switch 205 and the second switch 215. Hence, the third antenna 211 may transmit a signal provided from the main RFFE module 209 to other electronic device via the first diplexer 207. Also, a signal received through the third antenna 211 may be sent to the main RFFE module 209 via the first diplexer 207.

Figure 2D:
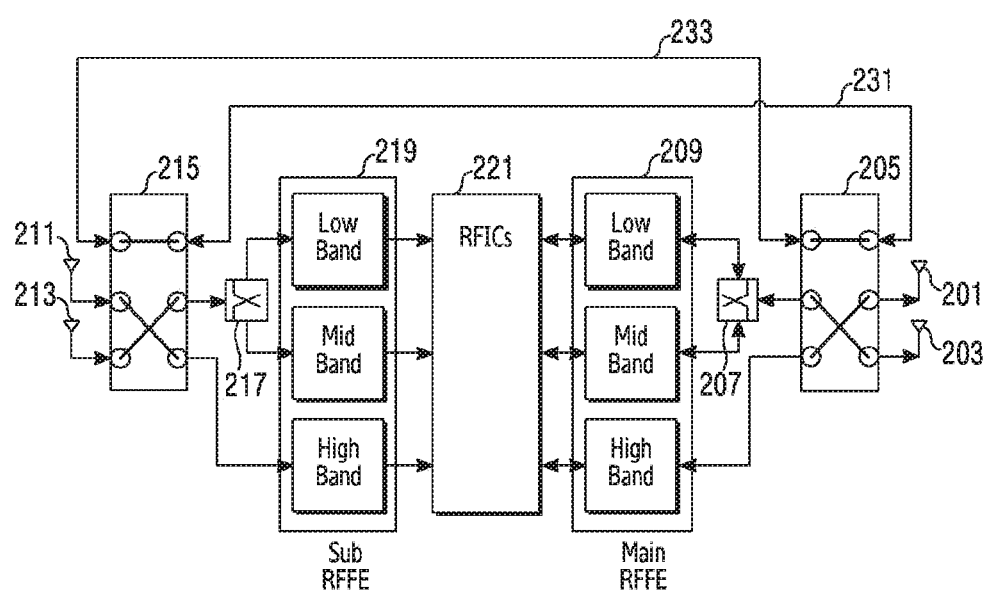

FIG. 2D may represent an antenna connection state according to switching (left/right antenna switching) of the operating frequency band of the first antenna 201 and the third antenna 211 and the operating frequency band of the third antenna 203 and the fourth antenna 213.

According to an embodiment, if the first antenna 201 operates as the main antenna for transceiving signals in the second frequency band according to the operating frequency band switching, it may be connected to the main RFFE module 209 through the first switch 205. Hence, the first antenna 201 may transmit a signal provided from the main RFFE module 209 to other electronic device. Also, a signal received through the first antenna 201 may be sent to the main RFFE module 209.

According to an embodiment, if the second antenna 203 operates as the main antenna for transceiving signals in the first frequency band according to the operating frequency band switching, it may be connected to the main RFFE module 209 through the first switch 205. Hence, the second antenna 203 may transmit a signal provided from the main RFFE module 209 to other electronic device via the first diplexer 207. Also, a signal received through the second antenna 203 may be sent to the main RFFE module 209 via the first diplexer 207.

According to an embodiment, if the third antenna 211 operates as the sub antenna for receiving signals in the second frequency band according to the operating frequency band switching, it may be connected to the sub RFFE module 219 through the second switch 215. Hence, a signal received through the third antenna 211 may be sent to the sub RFFE module 219.

According to an embodiment, if the fourth antenna 213 operates as the sub antenna for receiving signals in the first frequency band according to the operating frequency band switching, it may be connected to the sub RFFE module 219 through the second switch 215. Hence, a signal received via the fourth antenna 213 may be sent to the sub RFFE module 219 via the second diplexer 217.

Figure 2E:
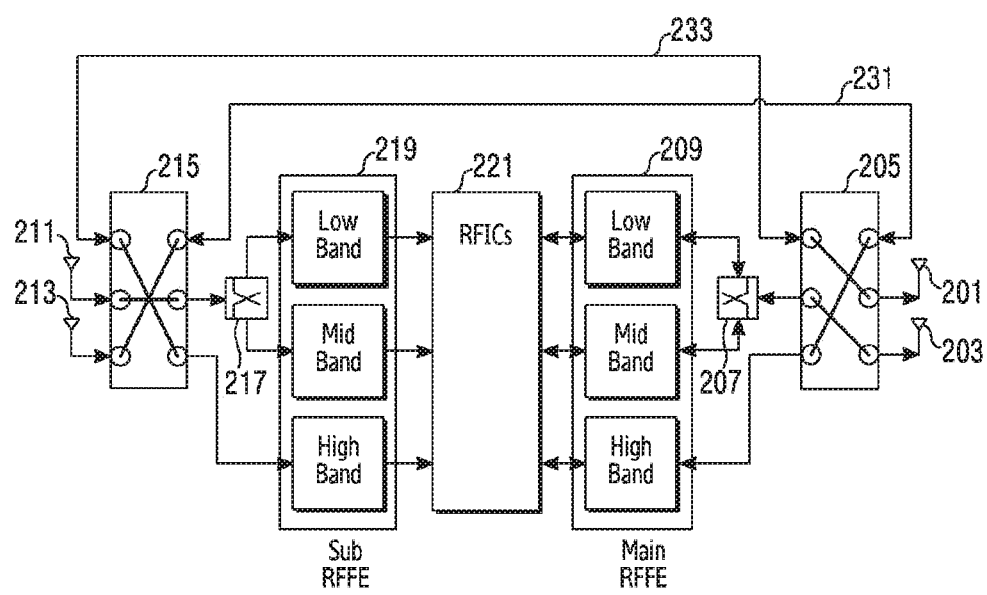

FIG. 2E may represent an antenna connection state for switching (left/right antenna switching) the operating frequency band of the first antenna 201 and the second antenna 203 and for switching (up/down antenna switching) the antenna operating scheme of the first antenna 201 and the fourth antenna 213.

According to an embodiment, if the first antenna 201 operates as the sub antenna for receiving signals in the second frequency band according to the up/down antenna switching and the left/right antenna switching, it may be connected to the sub RFFE module 219 through the second path 233 which connects the first switch 205 and the second switch 215. Hence, a signal received via the first antenna 201 may be sent to the sub RFFE module 219.

According to an embodiment, if the fourth antenna 213 operates as the main antenna for transceiving signals in the second frequency band according to the up/down the antenna switching, it may be connected to the main RFFE module 209 through the first path 231 which connects the first switch 205 and the second switch 215. Hence, the fourth antenna 213 may transmit a signal provided from the main RFFE module 209 to other electronic device. Also, a signal received via the fourth antenna 213 may be sent to the main RFFE module 209.

According to an embodiment, if the second antenna 203 operates as the main antenna for transceiving signals in the first frequency band according to the left/right antenna switching, it may be connected to the main RFFE module 209 through the first switch 205. Hence, the second antenna 203 may transmit a signal provided from the main RFFE module 209 to other electronic device via the first diplexer 207. Also, a signal received through the second antenna 203 may be sent to the main RFFE module 209 via the first diplexer 207.

According to an embodiment, if the third antenna 211 operates as the sub antenna for receiving signals in the first frequency band, it may be connected to the sub RFFE module 219 through the second switch 215. Hence, a signal received through the third antenna 211 may be sent to the sub RFFE module 219 via the second diplexer 217.

Figure 2F:
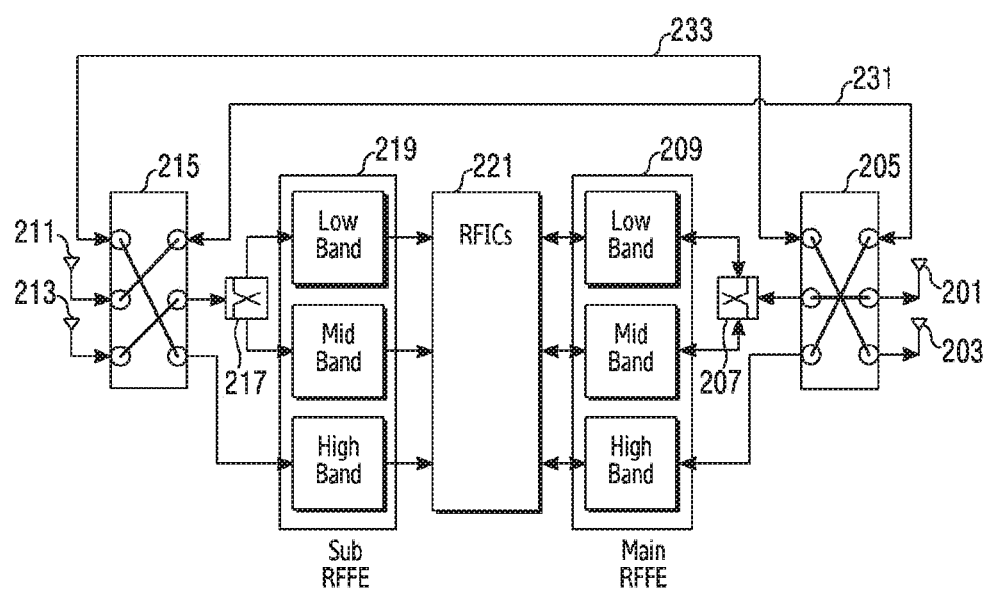

FIG. 2F may represent an antenna connection state for switching (left/right antenna switching) the operating frequency band of the third antenna 211 and the fourth antenna 213 and for switching (up/down antenna switching) the antenna operating scheme of the second antenna 203 and the third antenna 211.

According to an embodiment, if the third antenna 211 operates as the main antenna for transceiving signals in the second frequency band according to the up/down the antenna switching and the left/right antenna switching, it may be connected to the main RFFE module 209 through the first path 231 which connects the first switch 205 and the second switch 215. Hence, the third antenna 211 may transmit a signal provided from the main RFFE module 209 to other electronic device. Also, a signal received through the third antenna 211 may be sent to the main RFFE module 209.

According to an embodiment, if the second antenna 203 operates as the sub antenna for receiving signals in the second frequency band according to the up/down antenna switching, it may be connected to the sub RFFE module 219 through the second path 233 which connects the first switch 205 and the second switch 215. Hence, a signal received through the second antenna 203 may be sent to the sub RFFE module 219.

According to an embodiment, if the first antenna 203 operates as the main antenna for transceiving signals in the first frequency band, it may be connected to the main RFFE module 209 through the first switch 205. Hence, the first antenna 201 may transmit a signal provided from the main RFFE module 209 to other electronic device via the first diplexer 207. Also, a signal received through the first antenna 201 may be sent to the main RFFE module 209 via the first diplexer 207.

According to an embodiment, if the fourth antenna 213 operates as the sub antenna for receiving signals in the first frequency band according to the left/right antenna switching, it may be connected to the sub RFFE module 219 through the second switch 215. Hence, a signal received through the fourth antenna 213 may be sent to the sub RFFE module 219 via the second diplexer 217.

Figure 2G:
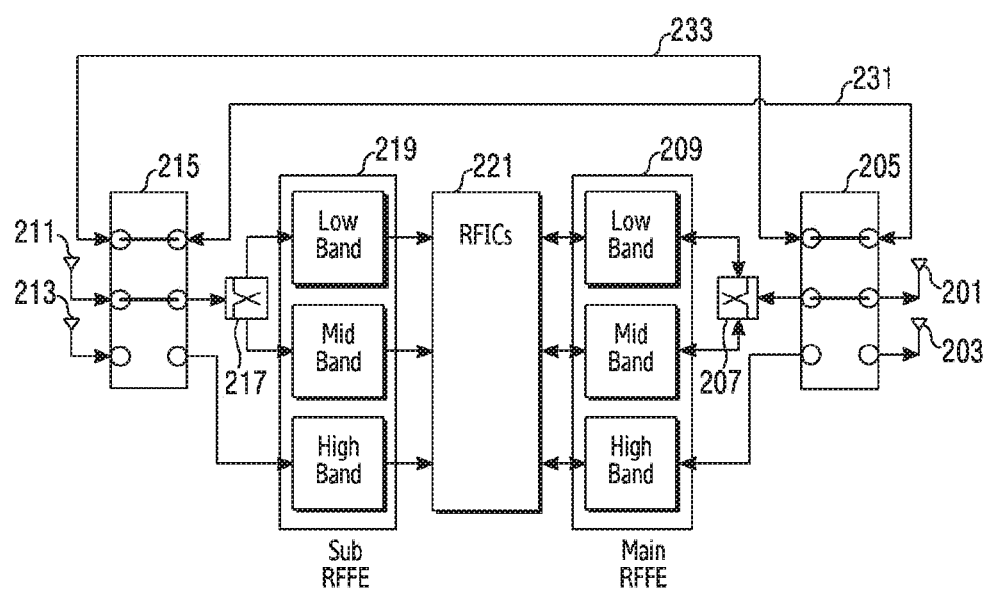

FIG. 2G may represent an antenna connection state for using the first antenna 201 and the third antenna 211 for the first frequency band.

According to an embodiment, if the first antenna 201 operates as the main antenna of the first frequency band, it may be connected to the first diplexer 207 through the first switch 205. In this case, the first switch 205 may not connect the second antenna 203 with the main RFFE module 209.

According to an embodiment, if the third antenna 211 operates as the sub antenna of the first frequency band, it may be connected to the second diplexer 217 through the second switch 215. In this case, the second switch 215 may not connect the fourth antenna 213 with the sub RFFE module 219.

Figure 2H:
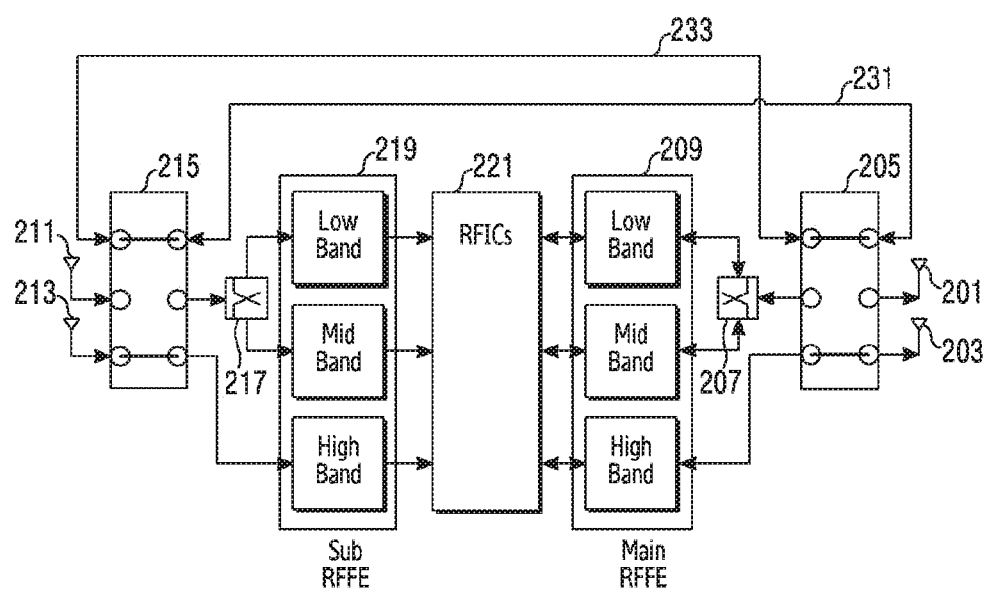

FIG. 2H may represent an antenna connection state for using the second antenna 203 and the fourth antenna 213 for the second frequency band.

According to an embodiment, if the second antenna 203 operates as the main antenna of the second frequency band, it may be connected to the main RFFE module 209 through the first switch 205. In this case, the first switch 205 may not connect the first antenna 201 with the first diplexer 207.

According to an embodiment, if the fourth antenna 213 operates as the sub antenna of the second frequency band, it may be connected to the sub RFFE module 219 through the second switch 215. In this case, the second switch 215 may not connect the third antenna 211 with the second diplexer 217.

Figure 2I:
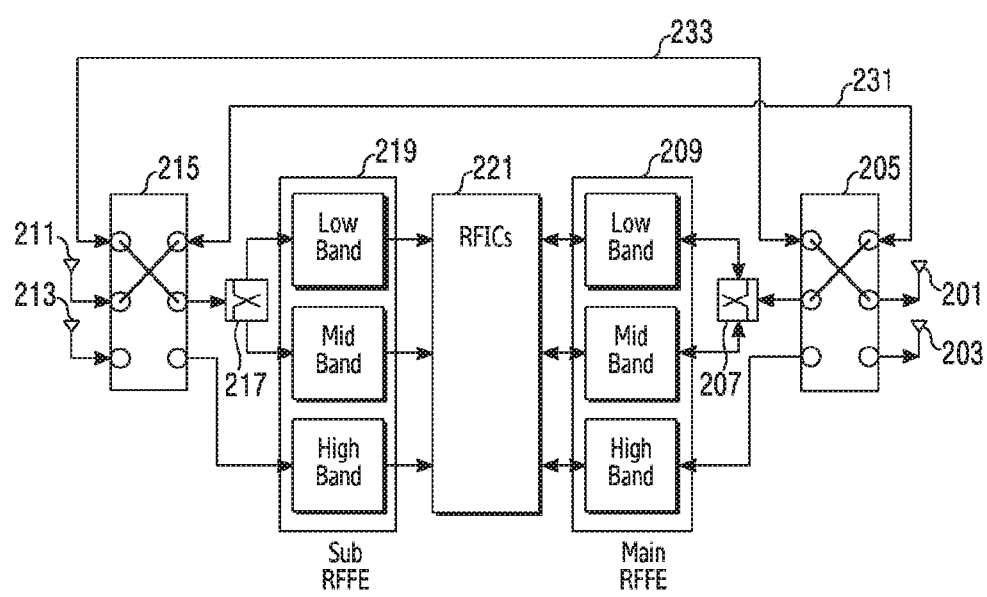

FIG. 2I may represent an antenna connection state for switching (up/down antenna switching) the antenna operation of the first antenna 201 and the third antenna 211 while the antennas 201 and 211 of the first frequency band are activated.

According to an embodiment, if the first antenna 201 operates as the sub antenna for receiving signals in the first frequency band through the up/down antenna switching, it may be connected to the second diplexer 217 through the second path 233 which connects the first switch 205 and the second switch 215.

According to an embodiment, if the third antenna 211 operates as the main antenna for transceiving signals in the first frequency band through the up/down antenna switching, it may be connected to the first diplexer 207 through the firth path 231 which connects the first switch 205 and the second switch 215.

Figure 2J:
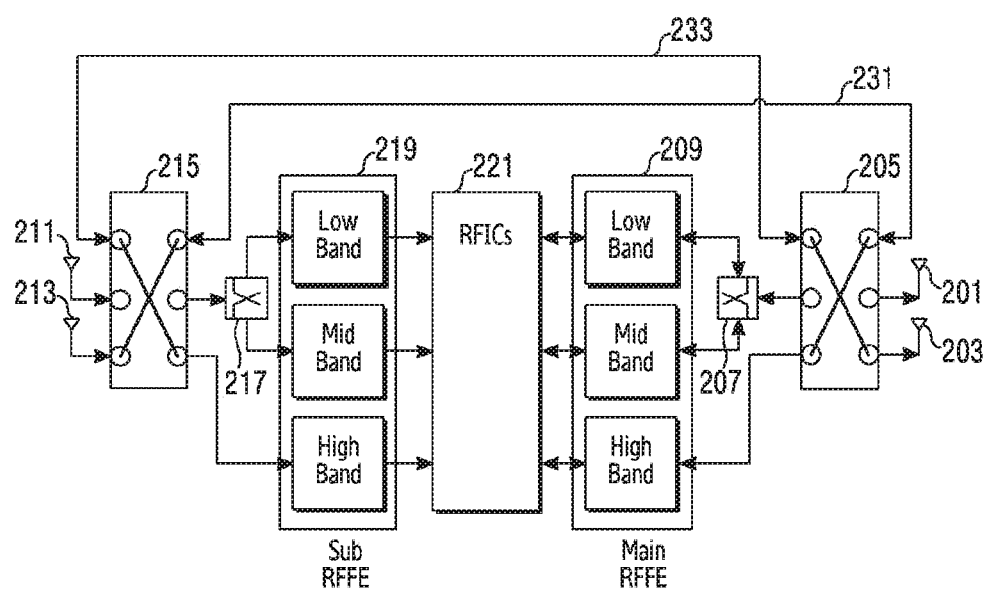

FIG. 2J may represent an antenna connection state for switching (up/down antenna switching) the antenna operation of the second antenna 203 and the fourth antenna 213 while the antennas 203 and 213 of the second frequency band are activated.

According to an embodiment, if the second antenna 203 operates as the sub antenna for receiving signals in the second frequency band through the up/down antenna switching, it may be connected to the sub RFFE module 219 through the second path 233 which connects the first switch 205 and the second switch 215.

According to an embodiment, if the fourth antenna 213 operates as the main antenna for transceiving signals in the second frequency band through the up/down antenna switching, it may be connected to the main RFFE module 209 through the firth path 231 which connects the first switch 205 and the second switch 215.

FIG. 3A through FIG. 3J illustrate another example of antenna connections in an electronic device according to various embodiments of the present invention. In the following, a first antenna 301 and a second antenna 303 may include the first antenna unit 120 and the second antenna unit 130 of FIG. 1B. A third antenna 311 and a fourth antenna 313 may include the third antenna unit 140 and the fourth antenna unit 150 of FIG. 1B.

Referring to FIG. 3A through FIG. 3J, an electronic device 300 may include a plurality of antennas 301, 303, 311, and 313, a plurality of diplexers 307 and 317, a plurality of RFFE modules 309 and 319, and an RFIC module 321. In the following, the antennas 301, 303, 311, and 313, the RFFE modules 309 and 319, and the RFIC module 321 of FIG. 3A through FIG. 3J operate the same as the components of the electronic device 200 of FIG. 2A through FIG. 2J and accordingly their detailed descriptions on the components are omitted.

According to an embodiment, the first diplexer 309 is used to transceive signals of the middle frequency band and the high frequency band via any one of the antennas 301, 303, 311, and 313. The second diplexer 319 may be used to receive signals of the middle frequency band and the high frequency band via any one of the antennas 301, 303, 311, and 313.

Figure 3A:
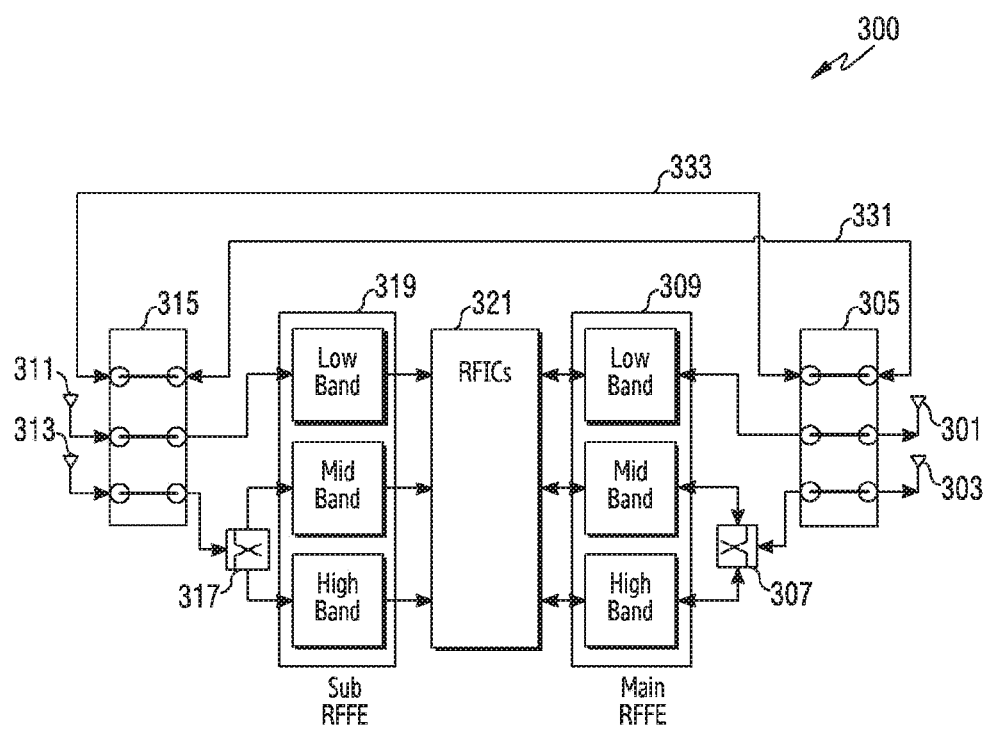
FIG. 3A through FIG. 3J illustrate another example of antenna connections in an electronic device according to various embodiments of the present invention.

FIG. 3A may present an antenna connection state if the first antenna 301 and the second antenna 303 operate as a main antenna for a corresponding frequency band and the third antenna 311 and the fourth antenna 313 operate as a sub antenna of a corresponding frequency band.

According to an embodiment, if the first antenna 301 operates as the main antenna for transceiving signals in the first frequency band (e.g., the low frequency band), it may be connected to the main RFFE module 309 through the first switch 305. Hence, the first antenna 301 may transmit a signal provided from the main RFFE module 309 to other electronic device. Also, a signal received via the first antenna 301 may be transmitted to the main RFFE module 309.

According to an embodiment, if the second antenna 303 operates as the main antenna for transceiving signals in the second frequency band (e.g., the middle frequency band and the high frequency band), it may be connected to the main RFFE module 309 through the first switch 305. Hence, the second antenna 303 may transmit a signal provided from the main RFFE module 309 to other electronic device via the first diplexer 307. Also, a signal received through the second antenna 303 may be transmitted to the main RFFE module 309 via the first diplexer 307.

According to an embodiment, if the third antenna 311 operates as the sub antenna for receiving signals in the first frequency band, it may be connected to the sub RFFE module 319 through the second switch 315. Hence, a signal received through the second antenna 311 may be transmitted to the sub RFFE module 319.

According to an embodiment, if the fourth antenna 313 operates as the sub antenna for receiving signals in the second frequency band, it may be connected to the sub RFFE module 319 through the second switch 315. Hence, a signal received through the fourth antenna 313 may be transmitted to the sub RFFE module 319 via the second diplexer 317.

Figure 3B:
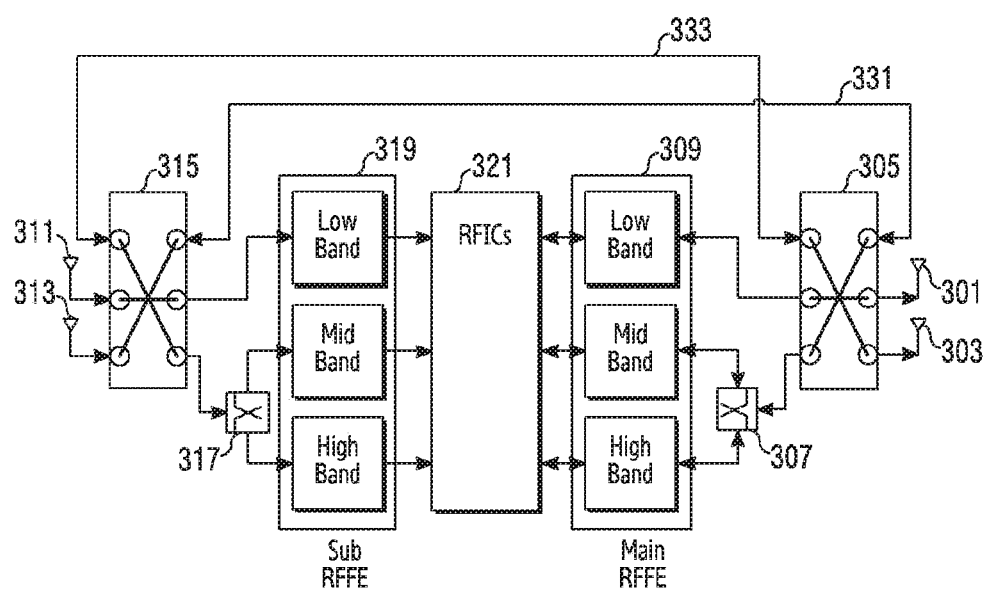

FIG. 3B may present an antenna connection state for switching (up/down antenna switching) the antenna operations of the second antenna 303 disposed in a first area (e.g., a bottom region) and the fourth antenna 313 disposed in a second region (e.g., a top region). Hereafter, since the first antenna 301 and the second antenna 311 of FIG. 3B operate the same as in FIG. 3A, descriptions on the antenna connection state of the first antenna 301 and the second antenna 311 are omitted.

According to an embodiment, if the second antenna 303 operates as the sub antenna for receiving signals in the second frequency band according to the up/down antenna switching, it may be connected to the sub RFFE module 319 through the second path 333 which connects the first switch 305 and the second switch 315. Hence, a signal received via the second antenna 303 may be transmitted to the sub RFFE module 319 through the second diplexer 317.

According to an embodiment, if the fourth antenna 313 operates as the main antenna for transceiving signals in the second frequency band according to the up/down antenna switching, it may be connected to the main RFFE module 309 through the first path 331 which connects the first switch 305 and the second switch 315. Thus, the fourth antenna 313 may transmit a signal provided from the main RFFE module 309 to other electronic device via the first diplexer 307. In addition, a signal received via the fourth antenna 313 may be sent to the main RFFE module 309 via the first diplexer 307.

Figure 3C:
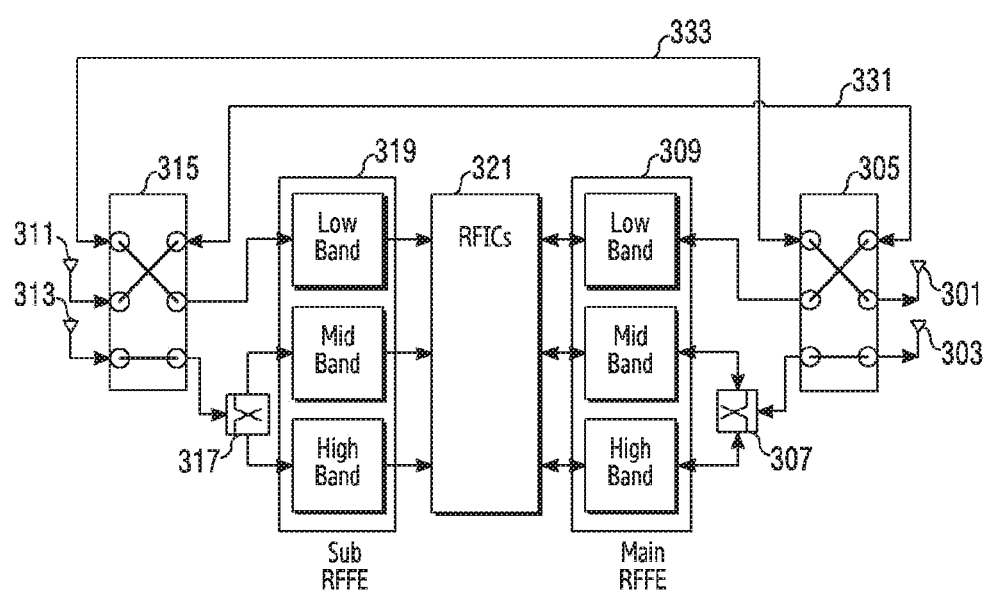

FIG. 3C may represent an antenna connection state for switching (up/down antenna switching) the operations of the first antenna 301 disposed in the first region (e.g., a bottom region) and the third antenna 311 disposed in the second region (e.g., a top region). Since the second antenna 303 and the fourth antenna 313 of FIG. 3C operate the same as in FIG. 3A, descriptions on the antenna connection state of the second antenna 303 and the fourth antenna 313 are omitted in the following.

According to an embodiment, if the first antenna 301 operates as the sub antenna for receiving signals in the first frequency band according to the up/down the antenna switching, it may be connected to the sub RFFE module 319 through the second path 333 which connects the first switch 305 and the second switch 315. Hence, a signal received through the first antenna 301 may be sent to the sub RFFE module 319.

According to an embodiment, if the third antenna 311 operates as the main antenna for transceiving signals in the first frequency band according to the up/down the antenna switching, it may be connected to the main RFFE module 309 through the first path 331 which connects the first switch 305 and the second switch 315. Hence, a signal received through the third antenna 311 may be sent to the main RFFE module 309.

Figure 3D:
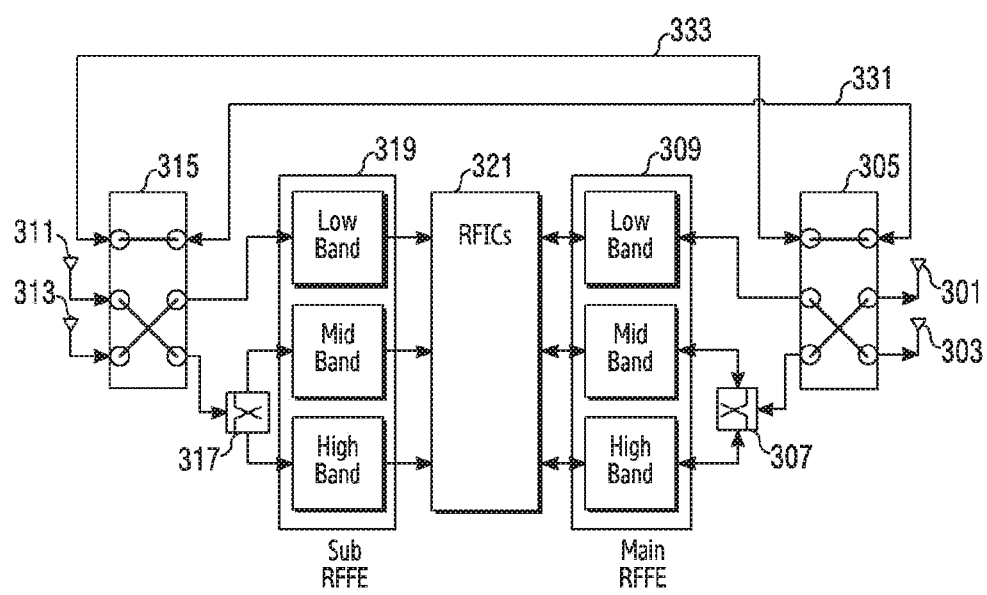

FIG. 3D may represent an antenna connection state according to the switching (left/right antenna switching) of the operating frequency band of the first antenna 301 and the third antenna 311 and the operating frequency band of the third antenna 303 and the fourth antenna 313.

According to an embodiment, if the first antenna 301 operates as the main antenna for transceiving signals in the second frequency band according to the operating frequency band switching, it may be connected to the main RFFE module 309 through the third switch 305. Hence, the first antenna 301 may transmit a signal provided from the main RFFE module 309 to other electronic device via the first diplexer 307. Also, a signal received via the first antenna 301 may be sent to the main RFFE module 309 via the first diplexer 307.

According to an embodiment, if the second antenna 303 operates as the main antenna for transceiving signals in the first frequency band according to the operating frequency band switching, it may be connected to the main RFFE module 309 through the first switch 305. Hence, the second antenna 303 may transmit a signal provided from the main RFFE module 309 to other electronic device. Also, a signal received through the second antenna 303 may be sent to the main RFFE module 319.

According to an embodiment, if the third antenna 311 operates as the sub antenna for receiving signals in the second frequency band according to the operating frequency band switching, it may be connected to the sub RFFE module 319 through the second switch 315. Hence, a signal received through the third antenna 311 may be sent to the sub RFFE module 319 via the second diplexer 317.

According to an embodiment, if the fourth antenna 313 operates as the sub antenna for receiving signals in the first frequency band according to the operating frequency band switching, it may be connected to the sub RFFE module 319 through the second switch 315. Hence, a signal received through the fourth antenna 313 may be sent to the sub RFFE module 319.

Figure 3E:
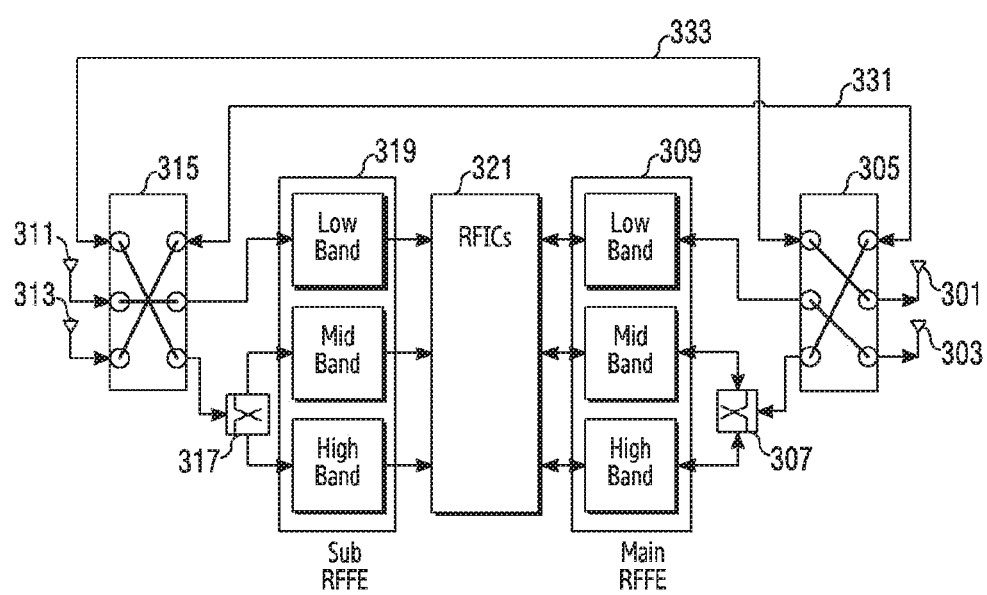

FIG. 3E may represent an antenna connection state for switching (left/right antenna switching) the operating frequency band of the first antenna 301 and the second antenna 303 and for switching (up/down antenna switching) the antenna operating scheme of the first antenna 301 and the fourth antenna 313.

According to an embodiment, if the first antenna 301 operates as the sub antenna for receiving signals in the second frequency band according to diagonal antenna switching, it may be connected to the sub RFFE module 319 through the second path 333 which connects the first switch 305 and the second switch 315. Hence, a signal received via the first antenna 301 may be sent to the sub RFFE module 119 via the second diplexer 317.

According to an embodiment, if the second antenna 313 operates as the main antenna for transceiving signals in the first frequency band according to the left/right the antenna switching, it may be connected to the main RFFE module 309 through the first switch 305. Hence, the second antenna 303 may transmit a signal provided from the main RFFE module 309 to other electronic device. Also, a signal received through the second antenna 303 may be sent to the main RFFE module 309.

According to an embodiment, if the third antenna 311 operates as the sub antenna for receiving signals in the first frequency band, it may be connected to the sub RFFE module 319 through the second switch 315.

According to an embodiment, if the fourth antenna 313 operates as the main antenna for transceiving signals in the second frequency band according to the up/down antenna switching, it may be connected to the main RFFE module 309 through the first path 331 which connects the first switch 305 and the second switch 315. Hence, the fourth antenna 313 may transmit a signal provided from the main RFFE module 309 to other electronic device through the first diplexer 307. Also, a signal received via the fourth antenna 313 may be sent to the main RFFE module 309 via the first diplexer 307.

Figure 3F:
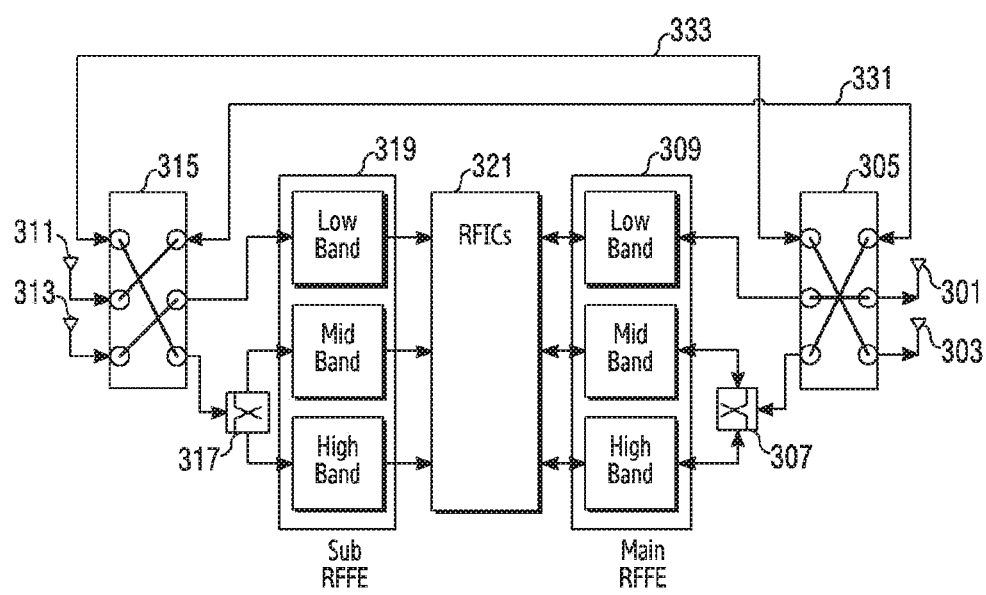

FIG. 3F may represent an antenna connection state for switching (left/right antenna switching) the operating frequency band of the third antenna 311 and the fourth antenna 313 and for switching (up/down antenna switching) the antenna operating scheme of the second antenna 303 and the third antenna 311.

According to an embodiment, if the first antenna 303 operates as the main antenna for transceiving signals in the first frequency band, it may be connected to the main RFFE module 309 through the first switch 305.

According to an embodiment, if the second antenna 303 operates as the sub antenna for receiving signals in the second frequency band according to the up/down antenna switching, it may be connected to the sub RFFE module 319 through the second path 333 which connects the first switch 305 and the second switch 315. Hence, a signal received through the second antenna 303 may be sent to the sub RFFE module 319 through the second diplexer 317.

According to an embodiment, if the third antenna 311 operates as the main antenna for transceiving signals in the second frequency band according to the diagonal antenna switching, it may be connected to the main RFFE module 309 through the first path 331 which connects the first switch 305 and the second switch 315. Hence, the third antenna 311 may transmit a signal provided from the main RFFE module 309 to other electronic device through the first diplexer 307. Also, a signal received via the third antenna 311 may be sent to the main RFFE module 309 through the first diplexer 307.

According to an embodiment, if the fourth antenna 313 operates as the sub antenna for receiving signals in the first frequency band according to the left/right antenna switching, it may be connected to the sub RFFE module 319 through the second switch 315.

Figure 3G:
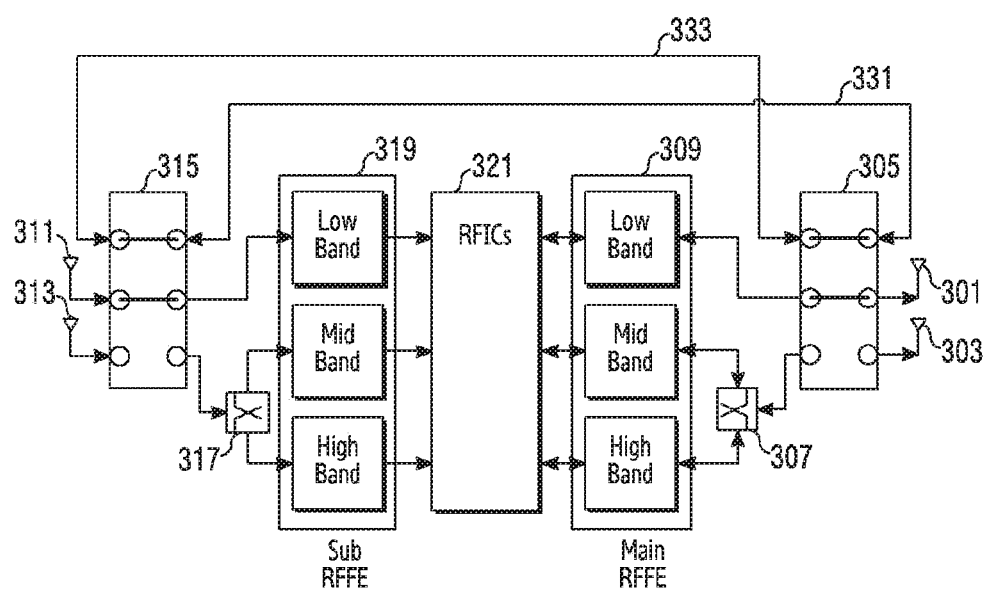

FIG. 3G may represent an antenna connection state for using the first antenna 301 and the third antenna 311 for the first frequency band while the first frequency band of the first frequency band and the second frequency band supportable by the electronic device 300 is activated.

According to an embodiment, if the first antenna 301 operates as the main antenna for transceiving signals in the first frequency band, it may be connected to the main RFFE module 309 through the first switch 305. In this case, the first switch 305 may deactivate (cut) the connection of the second antenna 303 and the main RFFE module 309 (e.g., the first diplexer 307).

According to an embodiment, if the third antenna 311 operates as the sub antenna for receiving signals in the first frequency band, it may be connected to the sub RFFE module 319 through the second switch 315. In this case, the second switch 315 may deactivate the connection of the fourth antenna 313 and the sub RFFE module 319 (e.g., the second diplexer 317).

Figure 3H:
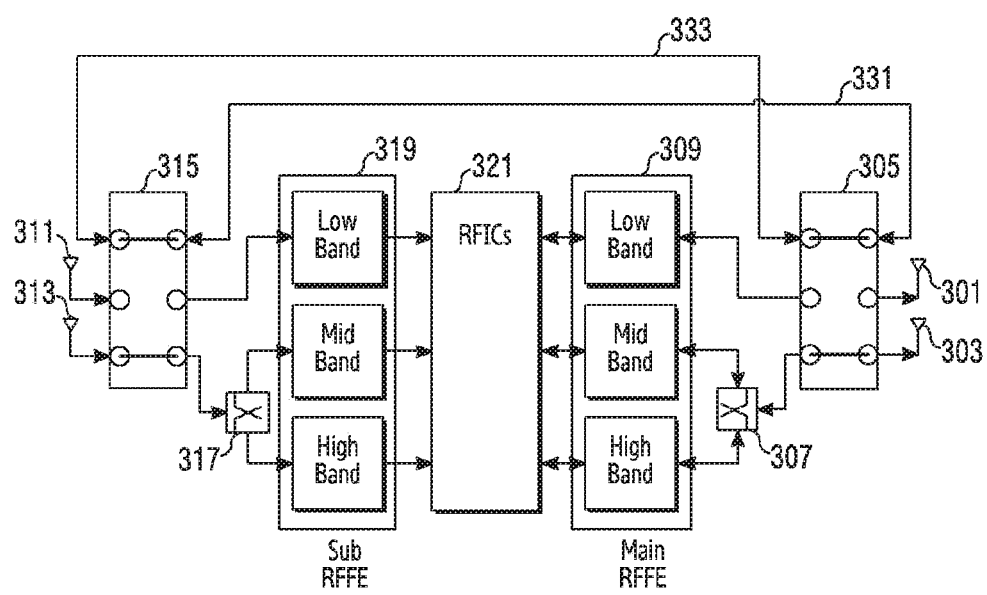

FIG. 3H may represent an antenna connection state for using the second antenna 303 and the fourth antenna 313 for the second frequency band while the second frequency band of the first frequency band and the second frequency band supportable by the electronic device 300 is activated.

According to an embodiment, if the second antenna 303 operates as the main antenna for transceiving signals in the second frequency band, it may be connected to the main RFFE module 309 (e.g., the first diplexer 307) through the first switch 305. In this case, the first switch 305 may deactivate (cut) the connection of the first antenna 301 and the main RFFE module 309.

According to an embodiment, if the fourth antenna 313 operates as the sub antenna for receiving signals in the second frequency band, it may be connected to the sub RFFE module 319 (e.g., the second diplexer 317) through the second switch 315. In this case, the second switch 315 may deactivate the connection of the third antenna 311 and the sub RFFE module 319.

Figure 3I:
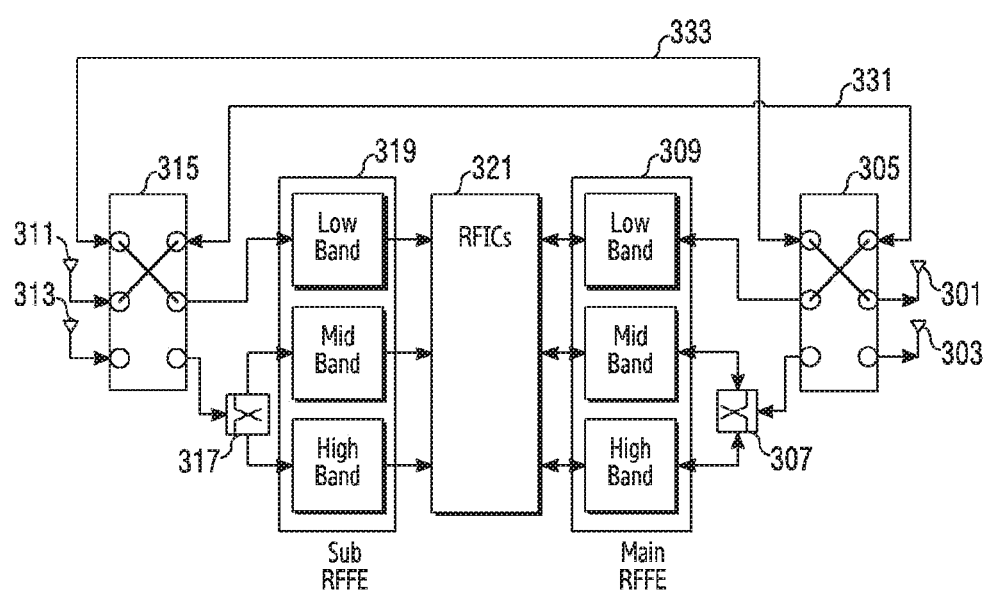

FIG. 3I may represent an antenna connection state for switching (up/down antenna switching) the antenna operation of the first antenna 301 and the third antenna 311 while the first frequency band is activated.

According to an embodiment, if the first antenna 301 operates as the sub antenna for receiving signals in the first frequency band through the up/down antenna switching, it may be connected to the sub RFFE module 317 through the second path 333 which connects the first switch 305 and the second switch 315.

According to an embodiment, if the third antenna 311 operates as the main antenna for transceiving signals in the first frequency band through the up/down antenna switching, it may be connected to the main RFFE module 307 through the firth path 331 which connects the first switch 305 and the second switch 315.

Figure 3J:
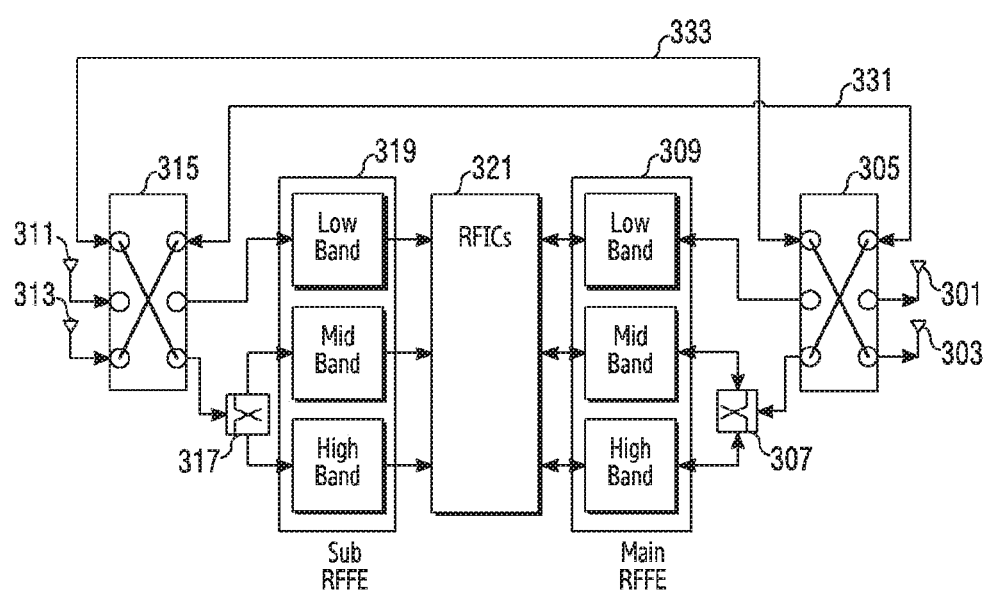

FIG. 3J may represent an antenna connection state for switching (up/down antenna switching) the antenna operation of the second antenna 303 and the fourth antenna 313 while the second frequency band is activated.

According to an embodiment, if the second antenna 303 operates as the sub antenna for receiving signals in the second frequency band through the up/down antenna switching, it may be connected to the sub RFFE module 319 (e.g., the second diplexer 317) through the second path 333 which connects the first switch 305 and the second switch 315.

According to an embodiment, if the fourth antenna 313 operates as the main antenna for transceiving signals in the second frequency band through the up/down antenna switching, it may be connected to the main RFFE module 309 (e.g., the first diplexer 307) through the firth path 331 which connects the first switch 305 and the second switch 315.

Figure 4:
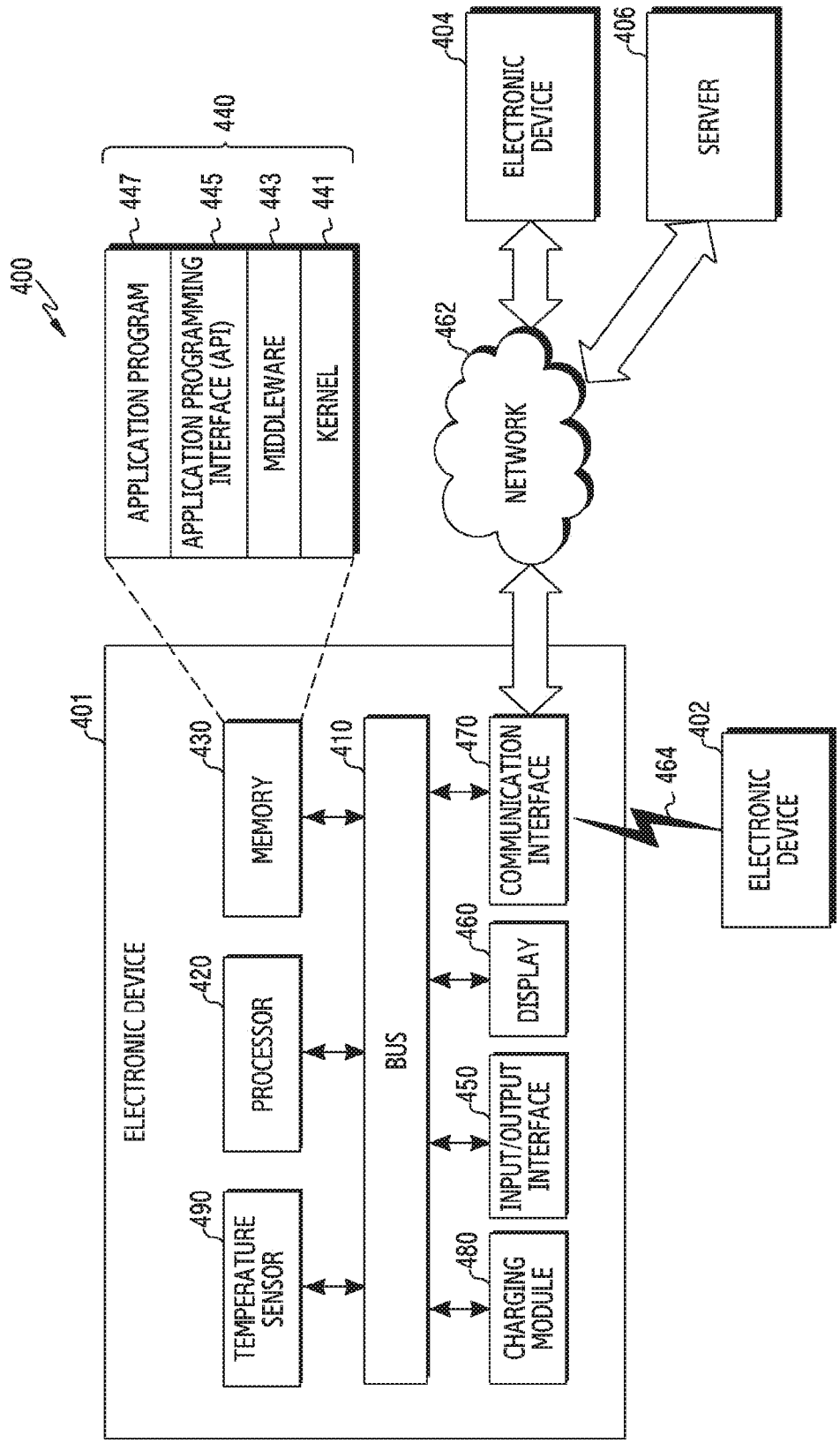
FIG. 4 illustrates an electronic device in a network environment according to various embodiments of the present invention.

FIG. 4 illustrates an electronic device 401 in a network environment 400 in various embodiments of the present invention.

Referring to FIG. 4, the electronic device 401 may include a bus 410, a processor 420, a memory 430, an input/output interface 450, a display 460, and a communication interface 470. In some embodiments, the electronic device 401 may omit at least one of the components or may further include other component.

The bus 410 may include, for example, a circuit which interconnects the components 420 through 470 and delivers a communication (e.g., a control message and/or data) between the components.

The processor 420 may include one or more of a central processing unit (CPU), an AP, and a CP. The processor 420 may carry out, for example, calculation or data processing relating to control and/or communication of at least one other components of the electronic device 401. According to an embodiment, the processor 420 may be implemented in the form of an RFIC module (e.g., the RFIC module 221 of FIG. 2A or the RFIC module 321 of FIG. 3A).

According to an embodiment, the processor 420 may control connection and use of antennas. For example, the processor 420 may control the connection and the use of the antennas based on transmission performance of the electronic device 401 and performance (e.g., reception performance) of the antenna functionally coupled with the electronic device 401.

According to an embodiment, if communication is connected with an external device through the communication interface 470, the processor 420 may control the antenna functionally coupled with the electronic device 401 to perform a predefined operation. For example, if the electronic device 401 connects the communication with the external device through the communication interface 470, the processor 420 may control the first switch 305 and the second switch 315 so that the first antenna 301 and the second antenna 303 operate as a main antenna for a corresponding frequency band and the third antenna 311 and the fourth antenna 313 operate as a sub antenna for a corresponding frequency band as shown in FIG. 3A.

According to an embodiment, the processor 420 may control connection switch of an antenna unit based on the transmission performance of the electronic device 401. For example, if the transmission performance of the electronic device 401 does not satisfy reference performance during the communication with the external device, the processor 420 may determine to switch the operation for the antenna unit. For example, the case where the transmission performance of the electronic device 401 does not satisfy the reference performance may include at least one of a case where a signal to noise ratio (SNR) of a main antenna unit of the electronic device 401 is below a preset value, a case where a transmit power of the main antenna unit is insufficient, a case where a difference of a receive power of a sub antenna unit and a receive power of the main antenna unit exceeds a preset threshold value, a case where return loss of a signal transmitted through the main antenna unit exceeds a preset value, or a case where interference occurs at the main antenna unit.

According to an embodiment, the processor 420 may control the communication interface 470 to perform up/down antenna switching based on the antenna performance. For example, if determining to switch the connection of the antenna unit based on the transmission performance of the electronic device 401, the processor 420 may determine to perform the up/down antenna switching by comparing the performance of the main antenna unit and the sub antenna unit. If the performance of the sub antenna unit is better than the performance of the main antenna unit, the processor 420 may control the communication interface 470 to perform the up/down antenna switching. For example, the processor 420 may control the first switch 305 and the second switch 315 to switch the antenna operation of the second antenna 303 disposed in a first region (e.g., a bottom region) of the electronic device 401 and the fourth antenna 313 disposed in a second region (e.g., a top region) as shown in FIG. 3B. For example, the antenna performance may include at least one of antenna received signal strength indication (RSSI), return loss, and SNR of the receive signal.

According to an embodiment, the processor 420 may select at least one antenna unit to use for the communication based on the antenna performance. For example, if determining to switch the connection of the antenna unit based on the transmission performance of the electronic device 401, the processor 420 may activate a plurality of antenna units functionally coupled with the electronic device 401. The processor 420 may select at least one antenna unit to use for the communication by comparing performance of the plurality of the antenna units. If other antenna (e.g., the sub antenna unit) than a predefined antenna (e.g., the main antenna unit) is selected as the antenna unit to use for the communication, the processor 420 may control the communication interface 470 to perform the up/down antenna switching. For example, the processor 420 may control the first switch 305 and the second switch 315 so as to switch the first antenna 301 which is operating as the main antenna of the first frequency band, to the sub antenna and to switch the third antenna 311 which is operating as the sub antenna, to the main antenna as shown in FIG. 3C.

According to an embodiment, the processor 420 may select at least one antenna unit to use for the communication based on a multi-antenna reception mode. For example, the processor 420 may determine whether to use the multi-antenna reception mode based on a wireless environment (e.g., a weak electric field, a strong electric field) and a traffic amount required by the electronic device 401. If determining to use the multi-antenna reception mode, the processor 420 may activate and use a plurality of antennas functionally coupled with the electronic device 401. Additionally or alternatively, the processor 420 may select at least one antenna unit to use for the communication based on a data rate or a scheduling time.

According to an embodiment, the processor 420 may control impedance mapping based on the connection and the use of the antennas. For example, if an antenna functionally coupled with the electronic device 401 is connected to perform a predefined operation, the processor 420 may control to match the antenna impedance in a closed loop scheme. For example, the antenna impedance of the closed loop scheme may indicate an impedance matching scheme which controls a tuning circuit for adjusting the impedance with a control value which is determined based on return loss of the electronic device 401. For example, if the operation of the antenna functionally coupled with the electronic device 401 is switched, the processor 420 may control to match the antenna impedance in an open loop scheme. For example, the antenna impedance of the open loop scheme may indicate an impedance matching scheme which controls the tuning circuit for adjusting the impedance with a control value which is included in a predefined lookup table.

The memory 430 may include a volatile and/or non-volatile memory. The memory 430 may store, for example, commands or data relevant to at least one other component of the electronic device 401. According to an embodiment, the memory 430 may store software and/or a program 440. For example, the program 440 may include a kernel 441, middleware 443, an application programming interface (API) 445, or an application program (or "application") 447. At least some of the kernel 441, the middleware 443, or the API 445 may be referred to as an operating system (OS).

The kernel 441 may control or manage system resources (e.g., the bus 410, the processor 420, or the memory 430) used for performing an operation or a function implemented in the other programs (e.g., the middleware 443, the API 445, or the application program 447). Furthermore, the kernel 441 may provide an interface through which the middleware 443, the API 445, or the application program 447 may access the individual component of the electronic device 401 to control or manage the system resources.

The middleware 443, for example, may serve as an intermediary for allowing the API 445 or the application program 447 to communicate with the kernel 441 to exchange data. Also, the middleware 443 may process one or more task requests received from the application program 447 according to priorities thereof. For example, the middleware 443 may assign priorities for using the system resources (e.g., the bus 410, the processor 420, or memory 430) of the electronic device 401, to at least one of the application program 447, and process one or more task requests. The API 445 is an interface through which the application program 447 controls functions provided from the kernel 441 or the middleware 443, and may include, for example, at least one interface or function (e.g., instruction) for file control, window control, image processing, or character control.

The input/output interface 450, for example, may function as an interface which may transfer commands or data input from a user or other external device to the other component(s) of the electronic device 401.

The display 460 may include, for example, a liquid crystal display (LCD), a light-emitting diode (LED) display, an organic light-emitting diode (OLED) display, or a microelectromechanical Systems (MEMS) display, or an electronic paper display. The display 460 may display, for example, various contents (e.g., text, images, videos, icons, and/or symbols) to the user. The display 460 may include a touch screen, and may receive, for example, a touch, gesture, proximity, or hovering input using an electronic pen or a user's body part.

The communication interface 470 may establish communication, for example, between the electronic device 401 and an external device (e.g., a first external electronic device 402, a second external electronic device 404, or a server 406). The communication interface 470 may be connected to a network 462 through wireless or wired communication and may communicate with the external device (e.g., the second external electronic device 404 or the server 406).

The wireless communication may include cellular communication which uses at least one of, for example, long term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). According to an embodiment, the wireless communication may include at least one of, for example, WiFi, light fidelity (LiFi), Bluetooth, Bluetooth low energy (BLE), Zigbee, near field communication (NFC), magnetic secure transmission (MST), radio frequency (RF), or body area network (BAN). According to an embodiment, the wireless communication may include GNSS. The GNSS may include, for example, a global positioning system (GPS), a global navigation satellite system (Glonass), Beidou navigation satellite system (Beidou) or Galileo, the European global satellite-based navigation system. Hereinafter, in the present disclosure, the term "GPS" may be interchangeably used with the term "GNSS". The wired communication may include, for example, at least one of a universal serial bus (USB), a high definition multimedia interface (HDMI), recommended standard 232 (RS-232), power line communication, or a plain old telephone service (POTS). The network 462 may include a telecommunication network, for example, at least one of a computer network (e.g., a LAN or a wide area network (WAN)), the Internet, or a telephone network.

The first and second external electronic devices 402 and 404 each may be the same as or different from the electronic device 401. According to various embodiments, all or some of the operations performed at the electronic device 401 may be executed in another one or a plurality of electronic devices (e.g., the electronic devices 402 and 404 or the server 406). According to an embodiment, if the electronic device 401 has to perform functions or services automatically or in response to a request, the electronic device 401 may request other device (e.g., the electronic device 402 or 404, or the server 406) to execute at least some functions relating thereto, instead of or in addition to autonomously performing the functions or services. The other device (e.g., the electronic device 402 or 404, or the server 406) may execute the requested functions or the additional functions, and deliver a result to the electronic device 401. The electronic device 401 may process the received result as it is or additionally, and thus provide the requested functions or services. To this end, for example, cloud computing, distributed computing, or client-server computing technologies may be used.

According to an embodiment, the communication interface 470 may control the connection of the antenna unit based on control of the processor 420. For example, the communications interface 470 may include, as shown in FIG. 3A, the antennas 301 and 303 disposed in the first region (e.g., the bottom region) of the electronic device 401, the antennas 311 and 313 disposed in the second region (e.g., top region), and the switches 305 and 315. The communication interface 470 may establish the connections of the antennas 301, 303, 311, and 313 and the internal element (e.g., the diplexers 307 and 317, the RFFE modules 309 and 319) of the electronic device 401 using the first switch 305, the second switch 315, and the first path 331 and the second path 333 which connect the switches 305 and 315.

Figure 5:
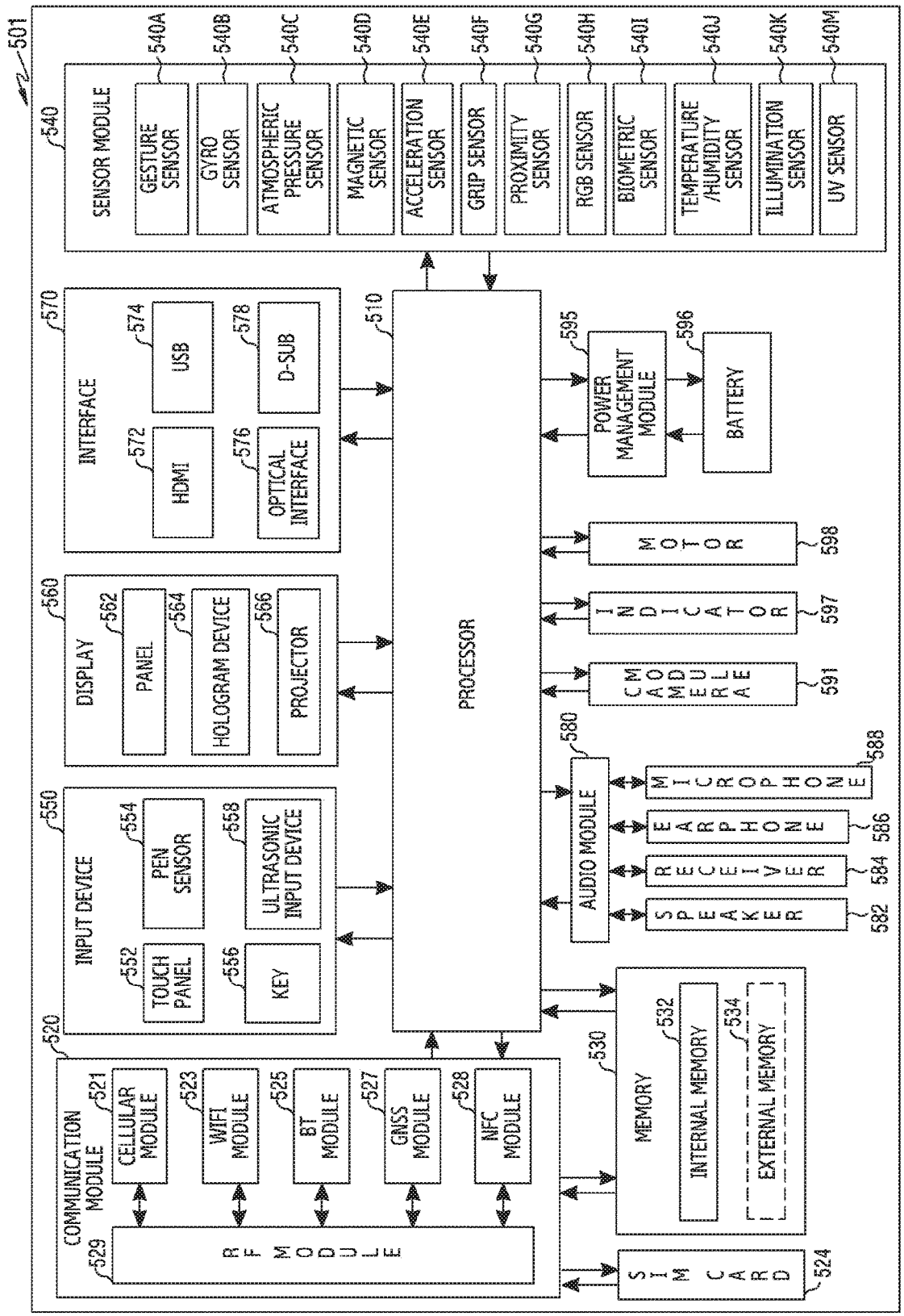
FIG. 5 illustrates a block diagram of an electronic device according to various embodiments of the present invention.

FIG. 5 is a block diagram of an electronic device according to an embodiment of the present disclosure.

Referring to FIG. 5, an electronic device 501 may, for example, include the entire or part of the electronic device 401 illustrated in FIG. 4. The electronic device 501 may include one or more processors (e.g., application processor (APs)) 510, a communication module 520, a subscriber identification module 524, a memory 530, a sensor module 540, an input device 550, a display 560, an interface 570, an audio module 580, a camera module 591, a power management module 595, a battery 596, an indicator 597 and a motor 598.

The processor 510 may, for example, drive an operating system or an application program to control a majority of hardware or software constituent elements coupled to the processor 510, and may perform various data processing and operations. The processor 510 may be, for example, implemented as a system on chip (SoC). According to an embodiment, the processor 510 may further include a graphic processing unit (GPU) and/or an image signal processor (ISP). The processor 510 may include at least some (e.g., cellular module 521) of the constituent elements illustrated in FIG. 5 as well. The processor 510 may load a command or data received from at least one of the other constituent elements (e.g., non-volatile memory), to a volatile memory, to process the loaded command or data, and store the result data in the non-volatile memory.

The communication module 520 may, for example, have the same or similar construction with the communication interface 470 in FIG. 4. The communication module 520 may, for example, include a cellular module 521, a WiFi module 523, a Bluetooth module 525, a GNSS module 527, an near field communication (NFC) module 528, and a radio frequency (RF) module 529.

The cellular module 521 may, for example, provide voice telephony, video telephony, a text service, an Internet service or the like through a telecommunication network. According to an embodiment, the cellular module 521 may perform the distinction and authentication of the electronic device 501 within the telecommunication network, by using the subscriber identification module (e.g., SIM card) 524. According to an embodiment, the cellular module 521 may perform at least some functions among functions that the processor 510 may provide. According to an embodiment, the cellular module 521 may include a communication processor (CP). According to some embodiment, at least some (e.g., two or more) of the cellular module 521, the WiFi module 523, the Bluetooth module 525, the GNSS module 527 or the NFC module 528 may be included within one integrated chip (IC) or IC package.

The RF module 529 may, for example, transceive a communication signal (e.g., RF signal). The RF module 529 may, for example, include a transceiver, a power amplifier module (PAM), a frequency filter, a low noise amplifier (LNA), an antenna or the like. According to another embodiment, at least one of the cellular module 521, the WiFi module 523, the Bluetooth module 525, the GNSS module 527 or the NFC module 528 may transceive an RF signal through a separate RF module.

The subscriber identification module 524 may, for example, include a card including a subscriber identification module and/or an embedded SIM. And, the subscriber identification module 524 may include unique identification information (e.g., integrated circuit card identifier (ICCID)) or subscriber information (e.g., international mobile subscriber identity (IMSI)).

The memory 530 (e.g., memory 430 in FIG. 4) may, for example, include an internal memory 532 or an external memory 534. The internal memory 532 may, for example, include at least one of a volatile memory (e.g., a dynamic random access memory (DRAM), a static RAM (SRAM), a synchronous dynamic RAM (SDRAM) or the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 534 may include a flash drive, for example, a compact flash (CF), a secure digital (SD), a micro-SD, a mini-SD, an extreme Digital (xD), a Multi Media Card (MMC), a memory stick or the like. The external memory 534 may be operatively or physically coupled with the electronic device 501 through various interfaces.

The sensor module 540 may, for example, measure a physical quantity or sense an activation state of the electronic device 501, to convert measured or sensed information into an electrical signal. The sensor module 540 may, for example, include at least one of a gesture sensor 540A, a gyro sensor 540B, a barometer 540C, a magnetic sensor 540D, an acceleration sensor 540E, a grip sensor 540F, a proximity sensor 540G, a color sensor 540H (e.g., a red, green, blue (RGB) sensor), a medical sensor 540I, a temperature/humidity sensor 540J, an illuminance sensor 540K or an ultra violet (UV) sensor 540M. Additionally or alternatively, the sensor module 540 may, for example, include an E-nose sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 540 may further include a control circuit for controlling at least one or more sensors belonging therein. In some embodiment, the electronic device 501 may further include a processor configured to control the sensor module 540 as a part of the processor 510 or separately, thereby controlling the sensor module 540 while the processor 510 is in a sleep state.

The input device 550 may, for example, include a touch panel 552, a (digital) pen sensor 554, a key 556 or an ultrasonic input device 558. The touch panel 552 may, for example, use at least one scheme among a capacitive overlay scheme, a pressure sensitive scheme, an infrared beam scheme or an ultrasonic scheme. Also, the touch panel 552 may further include a control circuit as well. The touch panel 552 may further include a tactile layer, to provide a tactile response to a user. The (digital) pen sensor 554 may, for example, be a part of the touch panel 552, or include a separate sheet for recognition. The key 556 may, for example, include a physical button, an optical key or a keypad. The ultrasonic input device 558 may sense an ultrasonic wave generated in an input tool, through a microphone (e.g., microphone 588), to confirm data corresponding to the sensed ultrasonic wave.

The display 560 (e.g., the display 160) may include a panel 562, a hologram device 564, a projector 566, and/or a control circuit for controlling them. The panel 562 may, for example, be implemented to be flexible, transparent, or wearable. The panel 562 may be constructed as one or more modules together with the touch panel 552. The hologram device 564 may show a three-dimensional image to the air using an interference of light. The projector 566 may project light onto a screen, to display an image. The screen may, for example, be located inside or outside the electronic device 501. The interface 570 may, for example, include an HDMI 572, a USB 574, an optical interface 576 or a D-subminiature (D-sub) 578. The interface 570 may, for example, be included in the communication interface 470 illustrated in FIG. 4. Additionally or alternatively, the interface 570 may, for example, include a Mobile High-definition Link (MHL) interface, an SD card/Multi Media Card (MMC) interface or an Infrared Data Association (IrDA) standard interface.

The audio module 580 may, for example, convert a sound and an electrical signal interactively. At least some constituent elements of the audio module 580 may be, for example, included in the input output interface 450 illustrated in FIG. 4. The audio module 580 may for example, process sound information that is inputted or outputted through a speaker 582, a receiver 584, an earphone 586, the microphone 588 or the like. The camera module 591 is, for example, a device able to photograph a still image and a video. According to an embodiment, the camera module 591 may include one or more image sensors (e.g., front sensor or rear sensor), a lens, an image signal processor (ISP) or a flash (e.g., an LED, a xenon lamp or the like). The power management module 595 may, for example, manage the electric power of the electronic device 501. According to an embodiment, the power management module 595 may include a power management integrated circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 596, a voltage being in charge, an electric current or a temperature. The battery 596 may, for example, include a rechargeable battery and/or a solar battery.

The indicator 597 may display a specific state, for example, a booting state, a message state, a charging state or the like of the electronic device 501 or a part (e.g., processor 510) of the electronic device 501. The motor 598 may convert an electrical signal into a mechanical vibration, and may generate a vibration, a haptic effect or the like. The electronic device 501 may, for example, include a mobile TV support device (e.g., GPU) capable of processing media data according to the standards of digital multimedia broadcasting (DMB), digital video broadcasting (DVB), media-Flo™ or the like. Each of the constituent elements described in the present document may consist of one or more components, and a name of the corresponding constituent element may be varied according to the kind of the electronic device. In various embodiments, the electronic device (e.g., electronic device 501) may omit some constituent elements, or further include additional constituent elements, or combine some of the constituent elements to configure one entity, but identically perform functions of corresponding constituent elements before combination.

According to various embodiments of the present invention, an electronic device may include a plurality of antenna units disposed in a first region of the electronic device, at least one antenna unit disposed in a second region of the electronic device, a communication circuit connected with the plurality of the antenna units disposed in the first region and the at least one antenna unit disposed in the second region, a first switch disposed in an electrical path which connects the at least one antenna unit with the communication circuit, and a second switch disposed in an electrical path which connects the at least one antenna unit with the communication circuit, wherein the first switch and the second switch may be configured to connect the plurality of the antenna units with the communication circuit and the at least one antenna unit with the communication circuit using a first electrical path and a second electrical path which connect the first switch and the second switch.

According to various embodiments, the first region may include a bottom or a top of the electronic device, and the second region may include other top or bottom of the electronic device than the first region.

According to various embodiments, the first switch may include input poles and output throws which are one more than the number of the plurality of the antenna units disposed in the first region, and the second switch may include input poles and output throws which are one more than the number of the at least one antenna unit disposed in the second region.

According to various embodiments, the communication circuit may include a first RFFE module for transceiving a signal using at least one antenna unit connected through the first switch, a second RFFE module for receiving a signal using at least one antenna unit connected through the second switch, an RFIC module for processing signals provided from the first RFFE module and the second RFFE module, and transmitting a signal to the first RFFE module, a first diplexer disposed in at least one of electrical paths which connect the first RFFE module and the first switch; and a second diplexer disposed in at least one of electrical paths which connect the second RFFE module and the second switch.

According to various embodiments, the first switch and the second switch may be configured to connect the plurality of the antenna units with the second RFFE module and the at least one antenna unit with the first RFFE module using a first electrical path and a second electrical path which connect the first switch and the second switch, the first switch may be configured to connect the plurality of the antenna units disposed in the first region with the first RFFE module, and the second switch may be configured to connect the at least one antenna unit disposed in the second region with the second RFFE module.

According to various embodiments, a processor may be further included, for controlling the first switch and the second switch to connect the plurality of the antenna units with the communication circuit and the at least one antenna unit with the communication circuit.

According to various embodiments, the processor may be configured to connect each antenna unit with the communication circuit based on transmission performance of the electronic device and performance of each antenna unit, the transmission performance of the electronic device may include at least one of a transmit power of a main antenna, a signal to noise ratio of the main antenna, a receive power difference of the main antenna and a sub antenna, or return loss of the main antenna, and the performance of the antenna unit may include at least one of a receive signal strength of the antenna unit, return loss, or a signal to noise ratio of the antenna unit.

According to various embodiments, the processor may control to tune antenna impedance in a closed loop scheme or an open loop scheme based on connection setting of the antenna unit.

According to various embodiments of the present invention, an electronic device includes an external housing which includes a first portion, a second portion adjacent to the first portion, a third portion further apart from the first portion than the second portion, and a fourth portion adjacent to the third portion, a first antenna radiator which forms at least part of the first portion and/or is formed in the housing in proximity to the first portion, a second antenna radiator which forms at least part of the second portion and/or is formed in the housing in proximity to the second portion, a third antenna radiator which forms at least part of the third portion and/or is formed in the housing in proximity to the third portion, a fourth antenna radiator which forms at least part of the fourth portion and/or is formed in the housing in proximity to the fourth portion, at least one communication circuit for supporting a frequency of a first frequency band and a frequency of a second frequency band which is lower than the first frequency band, a first electrical path configured to electrically connect the at least one communication circuit with the first antenna radiator, to transmit a signal of the frequency of the first frequency band, a second electrical path configured to electrically connect the at least one communication circuit with the second antenna radiator, to transmit a signal of the frequency of the first frequency band or the second frequency band at the same time or selectively, a third electrical path configured to electrically connect the at least one communication circuit with the third antenna radiator, to transmit a signal of the frequency of the first frequency band or the second frequency band at the same time or selectively, a fourth electrical path configured to electrically connect the at least one communication circuit with the fourth antenna radiator, to transmit a signal of the frequency of the first frequency band, a first switch for selectively connecting the first antenna, the second antenna, and the fifth electrical path with the first electrical path, the second electrical path, and the sixth electrical path respectively, and a second switch for selectively connecting the third antenna, the fourth antenna, and the sixth electrical path with the third electrical path, the fourth electrical path, and the fifth, electrical path respectively, wherein the fifth electrical path may transmit a signal of the first electrical path in a first state of the first switch and transmit a signal of the second electrical path in a second state of the first switch, and the sixth electrical path may transmit a signal of the third electrical path in a first state of the second switch and transmit a signal of the fourth electrical path in a second state of the second switch.

According to various embodiments, at least one of the fifth electrical path and the sixth electrical path may be configured with a coaxial cable.

Figure 6:
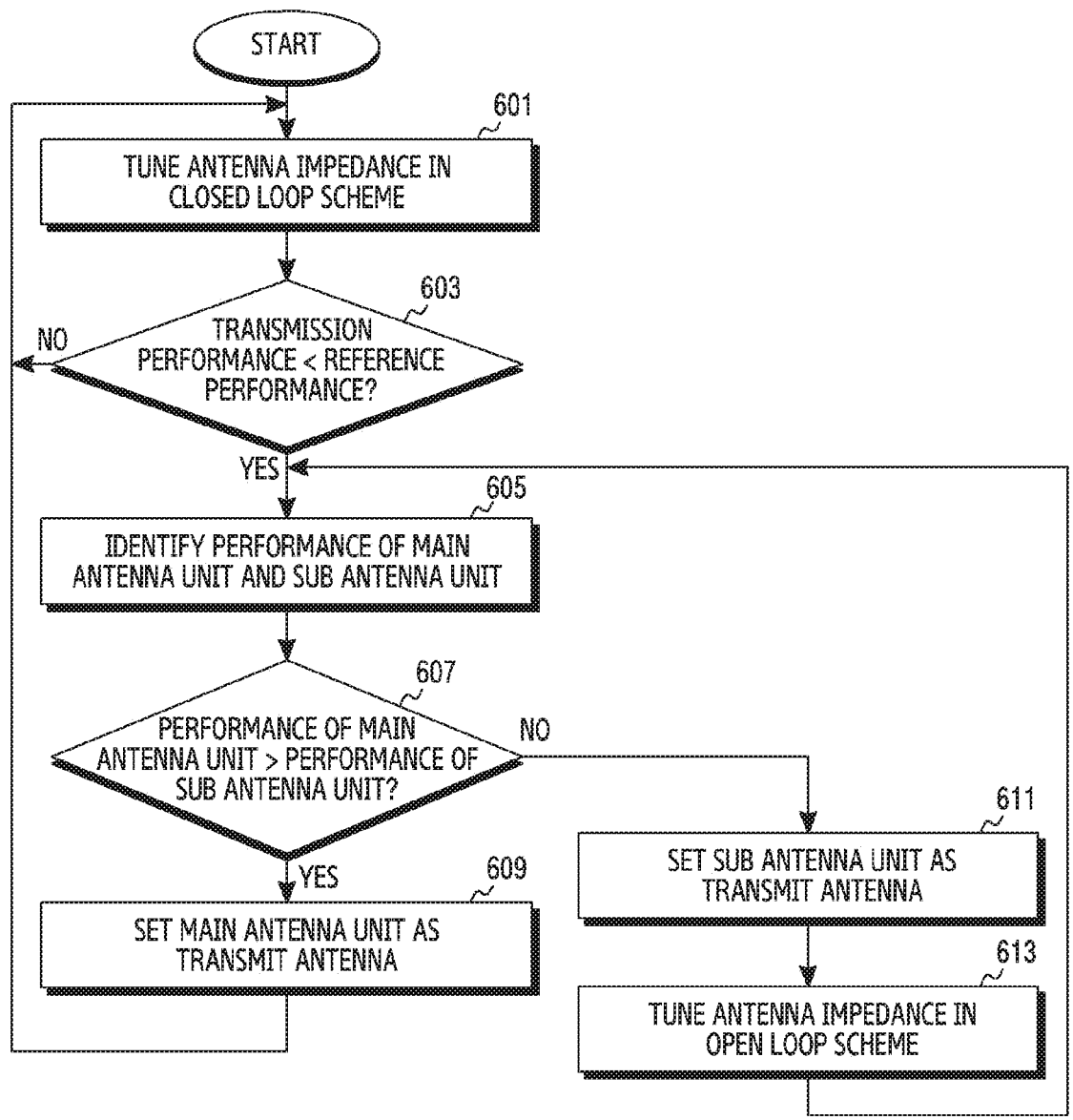
FIG. 6 illustrates a flowchart for up/down switching of antennas in an electronic device according to various embodiments of the present invention.

FIG. 6 illustrates a flowchart for up/down switching of antennas in an electronic device according to various embodiments of the present invention. In the following description, the electronic device may include the RFIC module 221 of FIG. 2A, the RFIC module 321 of FIG. 3A, or all or part of the electronic device 401 of FIG. 4.

Referring to FIG. 6, in operation 601, if communication with an external device is connected, the electronic device may tune antenna impedance in the closed loop scheme. For example, if the communication of the electronic device 401 and the external electronic device is connected, the processor 420 may connect an antenna unit and an internal element of the electronic device 401 so that the antenna unit functionally coupled with the electronic device 401 performs a predefined function (e.g., a main antenna or a sub antenna). For example, the processor 420 may connect the first antenna 301 with the main RFFE module 309 through the first switch 305 so as to operate as the main antenna of the first frequency band, as shown in FIG. 3G. Also, as shown in FIG. 3G, the processor 420 may connect the third antenna 311 with the sub RFFE module 309 through the second switch 315 so as to operate as the sub antenna of the first frequency band. In this case, the processor 420 may match the antenna impedance in the closed loop scheme.

In operation 603, the electronic device may identify whether transmission performance of the electronic device does not satisfy reference performance. For example, the processor 420 may identify the transmission performance of the electronic device according to the main antenna unit in real time or on a periodic basis during the communication with the external device. If the transmission performance of the electronic device 401 by the main antenna is lower than the reference performance, the processor 420 may determine that the transmission performance of the electronic device does not satisfy the reference performance. For example, the transmission performance of the electronic device may be determined based on at least one of an SNR of the main antenna unit, a transmit power of the main antenna unit, a difference of receive powers of the sub antenna unit and the main antenna unit, or return loss of the main antenna unit.

If the transmission performance of the electronic device satisfies the reference performance, the electronic device may maintain the operation of the antenna unit functionally coupled with the electronic device. Hence, the electronic device may maintain the tuning of the antenna impedance in the closed loop scheme in operation 601.

If the transmission performance of the electronic device does not satisfy the reference performance, the electronic device may identify the performance of the main antenna unit and the sub antenna unit in operation 605. For example, the performance of the antenna unit may include at least one of antenna RSSI, return loss, and SNR of the receive signal.

In operation 607, the electronic device may identify whether the performance of the main antenna unit is better than the performance of the sub antenna unit. For example, if the first antenna 301 is set as the main antenna and the third antenna 311 is set as the sub antenna as shown in FIG. 3G, the processor 420 may compare the performance of the first antenna 301 and the third antenna 311.

If the performance of the main antenna unit is better than the performance of the sub antenna unit, the electronic device may set the main antenna unit as a transmit antenna in operation 609. That is, the electronic device may maintain the operation of the antenna unit functionally coupled with the electronic device. In this case, the electronic device may match the antenna impedance in the closed loop scheme in operation 601.

If the performance of the sub antenna unit is better than the performance of the main antenna unit, the electronic device may set the sub antenna unit as the transmit antenna of the electronic device in operation 611. That is, the electronic device may perform up/down antenna switching for the antenna unit functionally coupled with the electronic device. For example, as shown in FIG. 3I, the processor 420 may control the switches 305 and 315 so as to operate the first antenna 301 as the sub antenna of the first frequency band and to operate the third antenna 311 as the main antenna of the first frequency band through the up/down antenna switching.

If performing the up/down antenna switching, the electronic device may tune the antenna impedance in the open loop scheme in operation 613. For example, the processor 420 may tune the antenna impedance based on a control value included in a predefined lookup table.

If tuning the antenna impedance in the open loop scheme, the electronic device may re-identify the performance of the main antenna unit and the sub antenna unit in operation 605.

According to various embodiments of the present invention, if the communication connection for transceiving traffic with the external device is released, the electronic device may stop controlling the connection and the use of the antennas as shown in operation 601 through operation 613 of FIG. 6.

Figure 7:
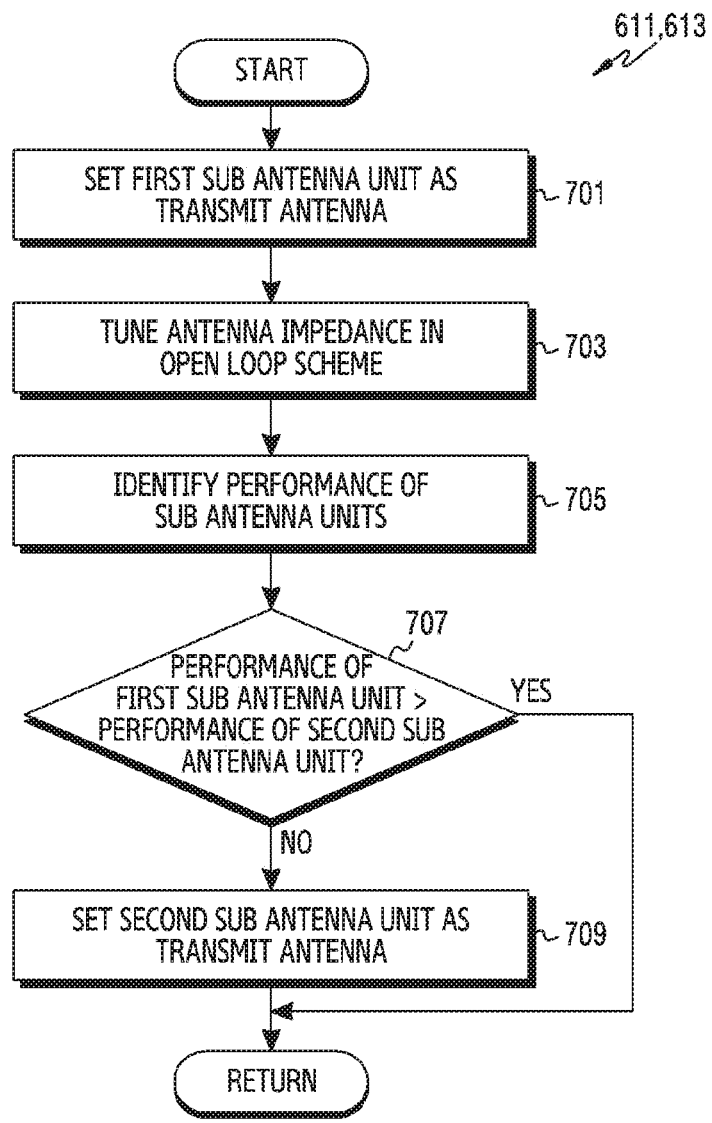
FIG. 7 illustrates a flowchart for left/right switching of antennas in an electronic device according to various embodiments of the present invention.

FIG. 7 illustrates a flowchart for left/right switching of antennas in an electronic device according to various embodiments of the present invention. The following descriptions explain operations for the antenna switching in operations 611 and 613 of FIG. 6. Hereafter, the electronic device may include the RFIC module 221 of FIG. 2A, the RFIC module 321 of FIG. 3A, or all or part of the electronic device 401 of FIG. 4.

Referring to FIG. 7, in operation 701, if performance of a sub antenna unit is better than performance of a main antenna unit (e.g., operation 607 of FIG. 6), the electronic device may set a first sub antenna unit as a transmit antenna. For example, if the first antenna 301 operates as the main antenna and the third antenna 311 operates as the sub antenna as shown in FIG. 3A, the electronic device may switch connections of the antenna unit and internal elements of the electronic device 401 so as to operate the first antenna 301 as the sub antenna and operate the third antenna 311 as the main antenna through the up/down antenna switching as shown in FIG. 3C.

If switching (e.g., the up/down antenna switching) the antenna operation, the electronic device may tune antenna impedance in the open loop scheme in operation 703.

In operation 705, the electronic device may compare performance of at least one antenna units disposed in the same region as the first sub antenna unit among antenna units functionally coupled with the electronic device. For example, the processor 420 may identify the performance of the third antenna 311 and the fourth antenna 313 disposed in the second region (e.g., the top region) of the electronic device 401 as shown in FIG. 3C.

In operation 707, the electronic device may identify whether the performance of the first sub antenna unit is better than the performance of the second sub antenna unit. For example, the processor 420 may compare antenna performance of the third antenna 311 and the fourth antenna 313 in FIG. 3C.

If the performance of the first sub antenna unit is better than the performance of the second sub antenna unit, the electronic device may maintain the main antenna operation of the first sub antenna unit.

If the performance of the second sub antenna unit is better than the performance of the first sub antenna unit, the electronic device may set the second sub antenna unit as a transmit antenna of the electronic device in operation 709. That is, the electronic device may change the operations of the first sub antenna unit and the second sub antenna unit through the left/right antenna switching. For example, the processor 420 may switch the connections of the antenna unit and the internal elements of the electronic device 401 so as to operate the fourth antenna 313 as the main antenna of the first frequency band through the left/right antenna switching as shown in FIG. 3D.

According to various embodiments of the present invention, if the antenna unit of which the connection with the communication circuit is changed through the antenna switching includes an antenna impedance tuner, the electronic device may match the antenna impedance according to the closed loop scheme. For example, if the antenna which is set as the transmit antenna through the up/down antenna switching or the left/right antenna switching includes the antenna impedance tuner, the processor 420 may control to tune the antenna impedance according to the closed loop scheme.

Figure 8:
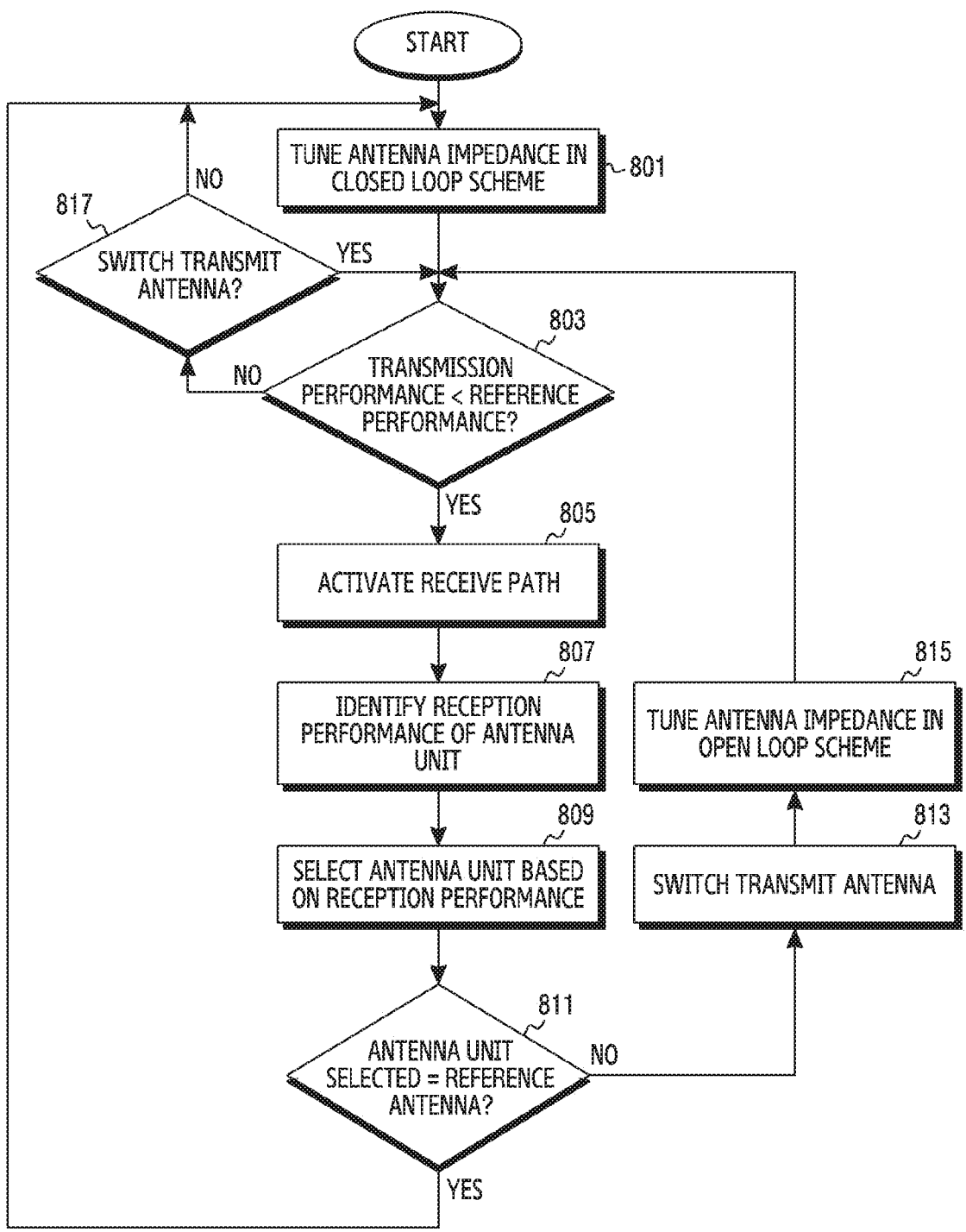
FIG. 8 illustrates a flowchart for up/down/left/right switching of antennas in an electronic device according to various embodiments of the present invention.

FIG. 8 illustrates a flowchart for up/down/left/right switching of antennas in an electronic device according to various embodiments of the present invention. In the following descriptions, the electronic device may include the RFIC module 221 of FIG. 2A, the RFIC module 321 of FIG. 3A, or all or part of the electronic device 401 of FIG. 4.

Referring to FIG. 8, in operation 801, if communication of the electronic device and an external device is connected, the electronic device may tune antenna impedance in the closed loop scheme. For example, if the communication of the electronic device 401 and the external electronic device is connected, the processor 420 may connect an antenna unit and internal elements of the electronic device 401 so that the antenna unit functionally coupled with the electronic device 401 performs a predefined function (e.g., a main antenna or a sub antenna). For example, the processor 420 may set to operate the first antenna 301 and the second antenna 303 as a main antenna of a corresponding frequency band, and to operate the third antenna 311 and the fourth antenna 313 as a sub antenna of a corresponding frequency band as shown in FIG. 3A. In this case, the processor 420 may match the antenna impedance in the closed loop scheme.

In operation 803, the electronic device may identify whether transmission performance of the electronic device does not satisfy reference performance. For example, if the transmission performance of the electronic device 401 by the main antenna is lower than the reference performance, the processor 420 may determine that the transmission performance of the electronic device does not satisfy the reference performance.

If the transmission performance of the electronic device does not satisfy the reference performance, the electronic device may activate a receive path of the electronic device in operation 805. For example, the processor 420 may activate all the antenna units functionally coupled with the electronic device 401.

In operation 807, the electronic device may identify reception performance of the antenna unit of the electronic device. For example, the processor 420 may identify the performance of the first antenna 301, the second antenna 303, the third antenna 311, and the fourth antenna 313 in FIG. 3A. For example, the reception performance of the antenna unit may include at least one of antenna RSSI and SNR of a received signal.

In operation 809, the electronic device may select at least one antenna unit to use as the transmit antenna by comparing the reception performance of the antenna unit. For example, the processor 420 may select at least one antenna unit as the transmit antenna of the electronic device 401 based on descending order of the reception performance of the antenna units.

In operation 811, the electronic device may identify whether the at least one antenna unit selected as the transmit antenna is a predefined reference antenna. For example, in FIG. 3A, the processor 420 may identify whether the at least one antenna unit selected as the transmit antenna is the first antenna 301 or the second antenna 303.

If the at least one antenna unit selected as the transmit antenna is not the predefined reference antenna, the electronic device may set the at least one antenna unit selected as the transmit antenna, as the transmit antenna of the electronic device in operation 813. That is, the electronic device may perform the up/down antenna switching or the left/right antenna switching on the antenna unit functionally coupled with the electronic device. For example, if selecting the first antenna 311 of FIG. 3A as the transmit antenna, the processor 420 may control the switches 305 and 315 so as to operate the first antenna 301 as the sub antenna of the first frequency band and to operate the third antenna 311 as the main antenna of the first frequency band through the up/down antenna switching as shown in FIG. 3C. For example, if selecting the second antenna 303 of FIG. 3A as the transmit antenna of the first frequency band, the processor 420 may control the switch 305 so as to operate the second antenna 303 as the main antenna of the first frequency band through the left/right antenna switching as shown in FIG. 3D. For example, if selecting the fourth antenna 313 of FIG. 3A as the transmit antenna of the first frequency band, the processor 420 may control the switches 305 and 315 so as to operate the fourth antenna 313 as the main antenna of the first frequency band through the diagonal antenna switching.

If conducting the antenna switching, the electronic device may tune the antenna impedance in the open loop scheme in operation 815.

If tuning the antenna impedance in the open loop scheme, the electronic device may re-identify whether the transmission performance of the electronic device does not satisfy the reference performance in operation 803.

If the transmission performance of the electronic device satisfies the reference performance (operation 803) or if the reference antenna is selected as the transmit antenna (operation 811), the electronic device may identify whether the transmit antenna is switched in operation 817.

If not switching the transmit antenna, the electronic device may match the antenna impedance in the closed loop scheme in operation 801.

If switching the transmit antenna, the electronic device may re-identify whether the transmission performance of the electronic device does not satisfy the reference performance. in operation 803.

According to various embodiments of the present invention, if the communication connection for transceiving traffic with an external device is released, the electronic device may stop controlling the connection and the use of the antennas as shown in operation 801 through operation 817 of FIG. 8.

According to various embodiments of the present invention, if the antenna unit of which the connection with the communication circuit is changed through the antenna switching includes an antenna impedance tuner, the electronic device may match the antenna impedance according to the closed loop scheme. For example, if the antenna unit which is set as the transmit antenna through the transmit antenna switching includes the antenna impedance tuner, the processor 420 may control to tune the antenna impedance according to the closed loop scheme.

Figure 9:
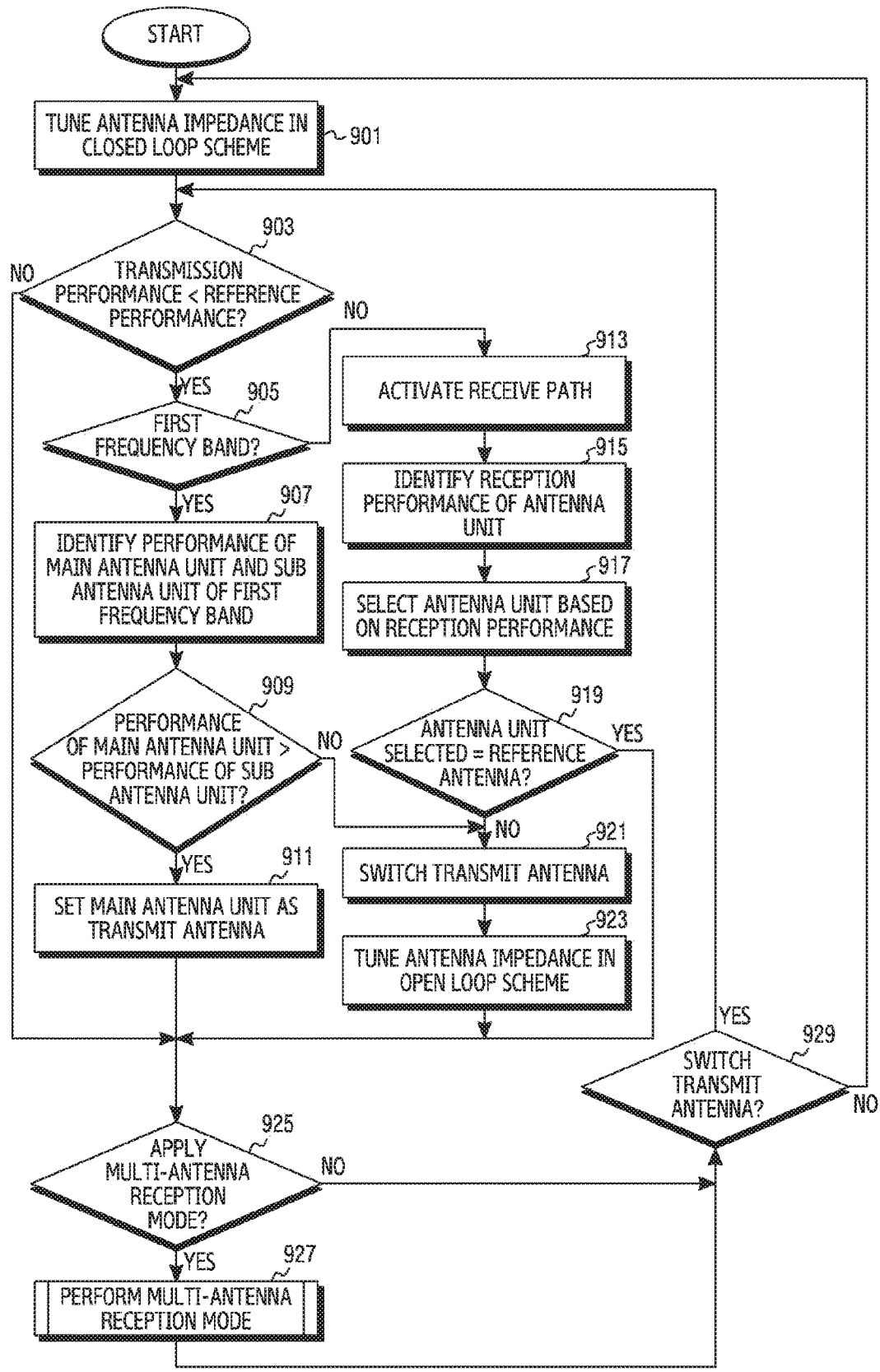
FIG. 9 illustrates a flowchart for providing antenna switching and a multi-antenna reception mode in an electronic device according to various embodiments of the present invention.

FIG. 9 illustrates a flowchart for providing antenna switching and a multi-antenna reception mode in an electronic device according to various embodiments of the present invention. In the following descriptions, the electronic device may include the RFIC module 221 of FIG. 2A, the RFIC module 321 of FIG. 3A, or all or part of the electronic device 401 of FIG. 4.

Referring to FIG. 9, in operation 901, if communication of the electronic device and an external device for transceiving traffic is connected, the electronic device may tune antenna impedance in the closed loop scheme. For example, if the communication of the electronic device 401 and the external electronic device for transceiving traffic is connected, the processor 420 may set to operate an antenna unit disposed in a first region (e.g., a bottom region) of the electronic device 401 as a main antenna, and set an antenna unit disposed in a second region (e.g., a top region) as a sub antenna. In this case, the processor 420 may match the antenna impedance in the closed loop scheme.

In operation 903, the electronic device may identify whether transmission performance of the electronic device according to the antenna setting does not satisfy reference performance. For example, if the transmission performance of the electronic device 401 by the first antenna 301 or the second antenna 303 is lower than the reference performance in FIG. 3A, the processor 420 may determine that the transmission performance of the electronic device 401 does not satisfy the reference performance.

If the transmission performance of the electronic device does not satisfy the reference performance, the electronic device may identify an operating frequency of the electronic device is a first frequency band in operation 905. For example, in FIG. 2A, the processor 420 may identify whether the operating frequency of the electronic device is the first frequency band including the low frequency band and the middle frequency band. For example, in FIG. 3A, the processor 420 may identify whether the operating frequency of the electronic device 401 is the first frequency band including the low frequency band.

If the operating frequency of the electronic device is the first frequency band, the electronic device may identify performance of the main antenna unit and the sub antenna unit of the first frequency band in operation 907. For example, the processor 420 may identify the performance of the first antenna 301 and the third antenna 311 in FIG. 3A.

In operation 909, the electronic device may identify whether the performance of the main antenna unit is better than the performance of the sub antenna unit. For example, the processor 420 may identify whether the performance of the first antenna 301 which is set as the main antenna is better than the performance of the third antenna 311 which is set as the sub antenna in FIG. 3A.

If the performance of the main antenna unit is better than the performance of the sub antenna unit, the electronic device may set the main antenna unit as a transmit antenna in operation 911. That is, the electronic device may maintain connections of the antenna unit functionally coupled with the electronic device and internal elements, without switching them.

If the operating frequency of the electronic device is the second frequency band, the electronic device may active a receive path of the electronic device in operation 913. For example, the processor 420 may activate the first antenna 301 and the third antenna 311 of the first frequency band and the second antenna 303 and the fourth antenna 313 of the second frequency band in FIG. 3A. For example, the second frequency band may include the high frequency band in FIG. 2A, and include the middle frequency band and the high frequency band in FIG. 3A In operation 915, the electronic device may identify reception performance of the activated antenna units. For example, the reception performance of the antenna unit may include at least one of antenna RSSI and SNR of a received signal.

In operation 917, the electronic device may select at least one antenna unit to use as the transmit antenna by comparing the reception performance of the antenna units. For example, the processor 420 may select at least one antenna unit as the transmit antenna of the electronic device 401 based on descending order of the reception performance of the antenna units functionally coupled with the electronic device 401.

In operation 919, the electronic device may identify whether the at least one antenna unit selected as the transmit antenna is a predefined reference antenna.

If the at least one antenna unit selected as the transmit antenna is not the predefined reference antenna, the electronic device may set the at least one antenna unit selected as the transmit antenna, as the transmit antenna of the electronic device in operation 921. That is, the electronic device may perform the antenna switching for the antenna unit functionally coupled with the electronic device. For example, the antenna switching may include at least one of the up/down antenna switching of FIG. 3B and FIG. 3C, the left/right antenna switching of FIG. 3D, and the diagonal antenna switching of FIG. 3E and FIG. 3F.

If performing the antenna switching, the electronic device may tune the antenna impedance in the open loop scheme in operation 923.

If the transmission performance of the electronic device satisfies the reference performance (operation 903) or if the transmit antenna is set (operation 911, operation 919, operation 923), the electronic device may determine whether to apply the multi-antenna reception mode in operation 925. For example, the processor 420 may determine whether to use the multi-antenna reception mode based on a wireless environment and a traffic amount required by the electronic device 401. For example, in a middle electric field, the processor 420 may determine whether the traffic amount required by the electronic device 401 exceeds a reference value corresponding to the middle electric field. If the traffic amount required by the electronic device 401 exceeds the reference value corresponding to the middle electric field, the processor 420 may determine to apply the multi-antenna reception mode.

If determining to apply the multi-antenna reception mode, the electronic device may perform the communication in the multi-antenna reception mode via the multiple antenna units in operation 927. For example, in FIG. 3A, the processor 420 may transceive traffic with an external device using the multiple antenna units 301, 303, 311, and 313 functionally coupled with the electronic device 401. Additionally or alternatively, the processor 420 may adjust the number of the antenna units to use for the communication based on a data rate or a scheduling time of the electronic device 401.

If determining not to apply the multi-antenna reception mode (operation 925) or if performing the multi-antenna reception mode (operation 927), the electronic device may identify whether the transmit antenna is switched in operation 929. For example, if communicating in the multi-antenna reception mode, the processor 420 may switch the connection of the antenna unit based on the performance of the antenna unit which operates in the multi-antenna reception mode. The processor 420 may tune the antenna impedance in the closed loop scheme or the open loop scheme based on the antenna switching.

If not switching the transmit antenna, the electronic device may tune the antenna impedance according to the closed loop scheme in operation 901.

If switching the transmit antenna, the electronic device may re-identify whether the transmission performance of the electronic device does not satisfy the reference performance in operation 903. In this case, the electronic device may tune the antenna impedance according to the open loop scheme.

According to various embodiments of the present invention, if the communication connection for transceiving traffic with the external device is released, the electronic device may stop controlling the connection and the use of the antennas as shown in operation 901 through operation 929 of FIG. 6.

According to various embodiments of the present invention, if the antenna unit of which the connection with the communication circuit is changed through the antenna switching includes an antenna impedance tuner, the electronic device may match the antenna impedance according to the closed loop scheme. For example, if the antenna unit which is set as the transmit antenna through the up/down antenna switching or the left/right antenna switching includes the antenna impedance tuner, the processor 420 may control to tune the antenna impedance according to the closed loop scheme.

According to various embodiments of the present invention, an operating method of an electronic device may include, if a first antenna unit disposed in a first region of the electronic device operates as a main antenna and a second antenna unit disposed in a second region operates as a sub antenna, tuning antenna impedance in a closed loop scheme, identifying performance of the first antenna unit and the second antenna unit, determining operations of the first antenna unit and the second antenna unit based on a performance comparison result of the first antenna unit and the second antenna unit, and, if determining to operate the first antenna unit as the sub antenna and to operate the second antenna unit as the main antenna, tuning the antenna impedance in an open loop scheme.

According to various embodiments, the first region may include a bottom or a top of the electronic device, and the second region may include other top or bottom of the electronic device than the first region.

According to various embodiments, performance of the antenna unit may include at least one of a receive signal strength of the antenna unit, return loss, or a signal to noise ratio of the antenna unit.

According to various embodiments, the method may further include determining whether to switch the operation of the antenna unit based on transmission performance of the electronic device, wherein the transmission performance of the electronic device may include at least one of a transmit power of the main antenna, a signal to noise ratio of the main antenna, a receive power difference of the main antenna and the sub antenna, or return loss of the main antenna.

According to various embodiments, identifying the performance may include, if determining to switch the operation of the antenna unit, identifying performance of the first antenna unit and the second antenna unit.

According to various embodiments, the method may further include, if determining to switch the operation of the antenna unit, identifying an operating frequency band of the electronic device, wherein identifying the performance may include, if the operating frequency band of the electronic device is a low frequency band, identifying the performance of the first antenna unit and the second antenna unit.

According to various embodiments, the method may further include, if the operating frequency band of the electronic device is a middle frequency band or a high frequency band, activating a plurality of antenna units functionally coupled with the electronic device, identifying performance of the plurality of the antenna units, selecting at least one antenna unit to use as a transmit antenna based on the performance of the plurality of the antenna units; and, if the selected at least one antenna unit is different from the first antenna unit, tuning antenna impedance in the open loop scheme.

According to various embodiments, the method may further include, if the selected at least one antenna unit includes the first antenna unit, tuning the antenna impedance in the closed loop scheme.

According to various embodiments, the method may further include, if applying a multi-antenna reception mode, activating a plurality of antenna units functionally coupled with the electronic device, and receiving traffic through the plurality of the antenna units.

According to various embodiments, receiving the traffic may include identifying performance of the plurality of the antenna units, selecting at least one antenna based on the performance of the plurality of the antenna units, and receiving the traffic via the at least one antenna unit.

Figure 10:
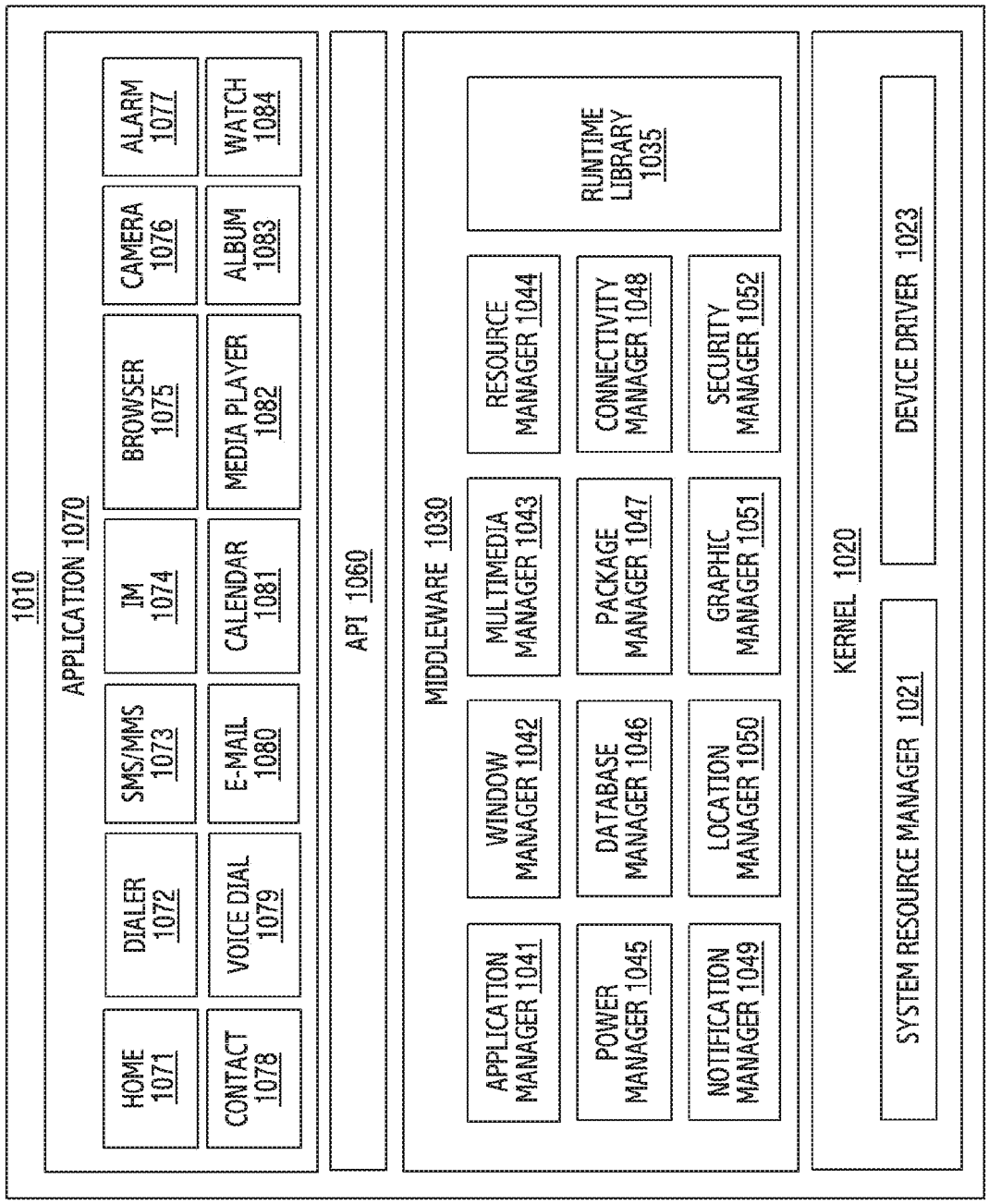
FIG. 10 illustrates a block diagram of a program module according to various embodiments of the present invention.

FIG. 10 is a block diagram of a program module according to an embodiment of the present disclosure. Referring to FIG. 10, a program module 1010 (e.g., the program 440) may include an Operating System (OS) for controlling resources related to an electronic device (e.g., the electronic device 401) and/or various applications (e.g., the application program 447) driven on the operating system. The operating system may, for example, include Android™, iOS™, Windows™, Symbian™, Tizen™ or Bada™.

Referring to FIG. 10, the program module 1010 may include a kernel 1020 (e.g., the kernel 441), a middleware 1030 (e.g., the middleware 443), an API 1060 (e.g., the API 445), and/or an application 1070 (e.g., the application program 447). At least a part of the program module 1010 may be preloaded onto an electronic device, or be downloaded from an external electronic device (e.g., the electronic device 402, 404, the server 406, etc.).

The kernel 1020 may, for example, include a system resource manager 1021 and/or a device driver 1023. The system resource manager 1021 may perform control of a system resource, allocation thereof, recovery thereof or the like. According to an embodiment, the system resource manager 1021 may include a process management unit, a memory management unit or a file system management unit. The device driver 1023 may, for example, include a display driver, a camera driver, a Bluetooth driver, a shared memory driver, a USB driver, a keypad driver, a WiFi driver, an audio driver or an inter-process communication (IPC) driver. The middleware 1030 may, for example, provide a function that the application 1070 commonly needs, or provide various functions to the application 1070 through the API 1060 so that the application 1070 may make use of restricted system resources within an electronic device. According to an embodiment, the middleware 1030 may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051 or a security manager 1052.

The runtime library 1035 may, for example, include a library module that a compiler uses to add a new function through a programming language while the application 1070 is executed. The runtime library 1035 may perform input output management, memory management or arithmetic function processing. The application manager 1041 may, for example, manage a lifecycle of the application 1070. The window manager 1042 may manage a graphic user interface (GUI) resource used by a screen. The multimedia manager 1043 may detect a format required for playing media files, and perform encoding or decoding of the media file by using a codec suitable to the corresponding format. The resource manager 1044 may manage a source code of the application 1070 or a space of a memory. The power manager 1045 may, for example, manage a battery capacity or a power supply, and provide power information required for an operation of an electronic device. According to an embodiment, the power manager 1045 may interwork with a basic input/output system (BIOS). The database manager 1046 may, for example, create, search or change a database that will be used by the application 1070. The package manager 1047 may manage installation or updating of an application that is distributed in a form of a package file.

The connectivity manager 1048 may, for example, manage wireless connectivity. The notification manager 1049 may, for example, provide events such as an arrival message, an appointment, a proximity notification, etc. to a user. The location manager 1050 may, for example, manage location information of an electronic device. The graphic manager 1051 may, for example, manage a graphic effect that will be provided to a user, or a user interface related with this. The security manager 1052 may, for example, provide system security or user authentication. According to an embodiment, the middleware 1030 may include a telephony manager for managing a voice or video telephony function of an electronic device, or a middleware module capable of forming a combination of functions of the aforementioned constituent elements. According to an embodiment, the middleware 1030 may provide a module that is specialized based on the type of an operating system. The middleware 1030 may dynamically delete some of the existing constituent elements or add new constituent elements. The API 1060 is, for example, a set of API programming functions, and may be provided to have another construction in accordance with the operating system. For example, Android or iOS may provide one API set by platform, and Tizen may provide two or more API sets by platform.

The application 1070 may, for example, include a home 1071, a dialer 1072, a short message service (SMS)/multimedia messaging service (MMS) 1073, an instant message (IM) 1074, a browser 1075, a camera 1076, an alarm 1077, a contact 1078, a voice dial 1079, an electronic mail (e-mail) 1080, a calendar 1081, a media player 1082, an album 1083, a watch 1084, health care (e.g., measuring a momentum, a blood sugar or the like), or an environment information (e.g., air pressure, humidity or temperature information) provision application. According to an embodiment, the application 1070 may include an information exchange application that may support information exchange between an electronic device and an external electronic device. The information exchange application may, for example, include a notification relay application for relaying specific information to the external electronic device, or a device management application for managing the external electronic device. For example, the notification relay application may relay notification information generated by another application of an electronic device to an external electronic device, or receive notification information from the external electronic device to provide the received notification information to a user. The device management application may, for example, install, delete or update a function (e.g., turn-on/turn-off of the external electronic device itself (or some constituent components) or adjustment of a brightness (or resolution) of a display) of the external electronic device that communicates with the electronic device, or an application operating in the external electronic device. According to an embodiment, the application 1070 may include an application (e.g., a health care application of a mobile medical instrument) designated according to an attribute of the external electronic device. According to an embodiment, the application 1070 may include an application received from the external electronic device. At least a part of the program module 1010 may be implemented (e.g., executed) by software, firmware, hardware (e.g., the processor 510) or a combination of at least two or more of them, and may include a module for performing one or more functions, a program, a routine, sets of instructions or a process.

The term "module," as used in the present disclosure may include a unit including hardware, software, and firmware, and, for example, may be interchangeably used with terms such as logic, logical block, component, circuit, and the like. "module" may be a minimum unit of an integral component or for performing one or more functions, or a part thereof. "module" may be mechanically or electrically implemented, and, for example, may include an application-specific integrated circuit (ASIC) chip, a field-programmable gate arrays (FPGAs), or a programmable-logic device, which are known or will be developed to perform certain operations.

At least part of a device (e.g., modules or functions thereof) or a method (e.g., operations) according to various embodiments may be implemented with instructions stored in a computer-readable storage medium (e.g., the memory 430) as a program module. If the instructions are executed by a processor (e.g., the processor 420), the processor may perform a function corresponding to the instructions. The computer-readable recording medium may include a hard disk, a floppy disc, a magnetic medium (e.g., a magnetic tape), an optical storage medium (e.g., a compact disc-ROM (CD-ROM) or a DVD), a magnetic-optic medium (e.g., a floptical disc), and an internal memory. The instructions may include code created by a compiler or code executable by an interpreter. The module or program module according to various embodiments may include at least one or more of the aforementioned components, or may omit some of them, or may further include additional other components.

The embodiments disclosed in the present disclosure are suggested to explain and understanding details of the invention, and do not limit the range of various embodiments of the present invention. Therefore, the range of various embodiments of the present invention should be construed as encompassing all modifications or various embodiments based on the technical idea of the various embodiments of the present invention.

The invention claimed is:

1. An electronic device comprising:
   a plurality of antenna units disposed in a first region of the electronic device;
   at least one antenna unit disposed in a second region of the electronic device;
   a communication circuit connected with the plurality of the antenna units disposed in the first region and the at least one antenna unit disposed in the second region;
   a first switch disposed in an electrical path which connects the plurality of antenna units with the communication circuit;
   a second switch disposed in an electrical path which connects the at least one antenna unit with the communication circuit; and
   a first electrical path and a second electrical path which connect the first switch and the second switch,
   wherein the first switch comprises input poles and output throws that each is respectively one more than the number of the plurality of the antenna units disposed in the first region, and
   wherein the second switch comprises input poles and output throws that each is respectively one more than the number of the at least one antenna unit disposed in the second region.

2. The electronic device of claim 1, wherein the first region comprises a bottom or a top of the electronic device, and
   the second region comprises other top or bottom of the electronic device than the first region.

3. The electronic device of claim 1, wherein the communication circuit comprises:
   a first radio frequency front end (RFFE) module for transceiving a signal using at least one antenna unit connected through the first switch;
   a second RFFE module for receiving a signal using at least one antenna unit connected through the second switch;
   a radio frequency integrated circuit (RFIC) module for processing signals provided from the first RFFE module and the second RFFE module, and transmitting a signal to the first RFFE module;
   a first diplexer disposed in at least one of electrical paths which connect the first RFFE module and the first switch; and
   a second diplexer disposed in at least one of electrical paths which connect the second RFFE module and the second switch.

4. The electronic device of claim 3, wherein the first switch and the second switch are configured to connect the plurality of the antenna units with the second RFFE module and the at least one antenna unit with the first RFFE module using a first electrical path and a second electrical path which connect the first switch and the second switch,
   the first switch is configured to connect the plurality of the antenna units disposed in the first region with the first RFFE module, and
   the second switch is configured to connect the at least one antenna unit disposed in the second region with the second RFFE module.

5. The electronic device of claim 1, further comprising:
   a processor for controlling the first switch and the second switch to connect the plurality of the antenna units with the communication circuit and the at least one antenna unit with the communication circuit.

6. The electronic device of claim 5, wherein the processor is configured to connect each antenna unit with the communication circuit based on transmission performance of the electronic device and performance of each antenna unit, and
   wherein the transmission performance of the electronic device comprises at least one of a transmit power of a main antenna, a signal to noise ratio of the main antenna, a receive power difference of the main antenna and a sub antenna, or return loss of the main antenna, and
   the performance of the antenna unit comprises at least one of a receive signal strength of the antenna unit, return loss, or a signal to noise ratio of the antenna unit.

7. The electronic device of claim 5, wherein the processor controls to tune antenna impedance in a closed loop scheme or an open loop scheme based on connection setting of the antenna unit.

8. An operating method of an electronic device, comprising:
   if a first antenna unit disposed in a first region of the electronic device operates as a main antenna and a second antenna unit disposed in a second region operates as a sub antenna, tuning antenna impedance in a closed loop scheme;
   identifying performance of the first antenna unit and the second antenna unit;
   determining operations of the first antenna unit and the second antenna unit based on a performance comparison result of the first antenna unit and the second antenna unit;
   if determining to operate the first antenna unit as the sub antenna and to operate the second antenna unit as the main antenna, tuning the antenna impedance in an open loop scheme, and
   determining whether to switch, by at least one switch, the operation of at least one of the first antenna unit or the second antenna unit based on transmission performance of the electronic device,
   wherein the at least one switch comprises input poles and output throws that each is respectively one more than a number of the plurality of the antenna units disposed in at least one of the first region or the second region.

9. The method of claim 8,
   wherein the transmission performance of the electronic device comprises at least one of a transmit power of the main antenna, a signal to noise ratio of the main antenna, a receive power difference of the main antenna and the sub antenna, or return loss of the main antenna.

10. The method of claim 9, wherein identifying the performance comprises:
    if determining to switch the operation of the antenna unit, identifying performance of the first antenna unit and the second antenna unit.

11. The method of claim 9, further comprising:
if determining to switch the operation of the antenna unit, identifying an operating frequency band of the electronic device,
wherein identifying the performance comprises:
if the operating frequency band of the electronic device is a low frequency band, identifying the performance of the first antenna unit and the second antenna unit.

12. The method of claim 11, further comprising:
if the operating frequency band of the electronic device is a middle frequency band or a high frequency band, activating a plurality of antenna units functionally coupled with the electronic device;
identifying performance of the plurality of the antenna units;
selecting at least one antenna unit to use as a transmit antenna based on the performance of the plurality of the antenna units; and
if the selected at least one antenna unit is different from the first antenna unit, tuning antenna impedance in the open loop scheme.

13. The method of claim 12, further comprising:
if the selected at least one antenna unit comprises the first antenna unit, tuning the antenna impedance in the closed loop scheme.

14. The method of claim 8, further comprising:
if applying a multi-antenna reception mode, activating a plurality of antenna units functionally coupled with the electronic device; and
receiving traffic through the plurality of the antenna units.

* * * * *